US012592730B2

(12) United States Patent
Mochizuki

(10) Patent No.: US 12,592,730 B2
(45) Date of Patent: Mar. 31, 2026

(54) SIGNAL PROCESSING DEVICE, SIGNAL PROCESSING METHOD, AND NON-TRANSITORY COMPUTER READABLE MEDIUM FOR A DISTORTION COMPENSATION CIRCUIT

(71) Applicant: NEC Corporation, Tokyo (JP)

(72) Inventor: Takuji Mochizuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 313 days.

(21) Appl. No.: 18/269,259

(22) PCT Filed: Nov. 16, 2021

(86) PCT No.: PCT/JP2021/041999
§ 371 (c)(1),
(2) Date: Jun. 22, 2023

(87) PCT Pub. No.: WO2022/137891
PCT Pub. Date: Jun. 30, 2022

(65) Prior Publication Data
US 2024/0056111 A1 Feb. 15, 2024

(30) Foreign Application Priority Data
Dec. 25, 2020 (JP) ................................. 2020-217114

(51) Int. Cl.
*H04B 1/04* (2006.01)
(52) U.S. Cl.
CPC ... *H04B 1/0475* (2013.01); *H04B 2001/0408* (2013.01)
(58) Field of Classification Search
CPC ...................... H02B 1/0475; H02B 2001/0408
See application file for complete search history.

(56) References Cited

U.S. PATENT DOCUMENTS

2010/0159856 A1* 6/2010 Kato ......................... H03F 3/19
330/149
2011/0298536 A1* 12/2011 Okazaki .................... H03F 3/24
330/75
(Continued)

FOREIGN PATENT DOCUMENTS

JP 2010-519862 A 6/2010
JP 2013-515424 A 5/2013
(Continued)

OTHER PUBLICATIONS

International Search Report for PCT Application No. PCT/JP2021/041999, mailed on Feb. 15, 2022.

*Primary Examiner* — Nicholas Pachol
(74) *Attorney, Agent, or Firm* — Sughrue Mion, PLLC

(57) ABSTRACT

A signal processing device according to an example embodiment includes: a distortion compensation circuit configured to output a signal subjected to distortion compensation processing; a plurality of amplifiers configured to amplify the plurality of input signals including the signal output from the distortion compensation circuit and output the amplified signals as output signals; a calculation circuit configured to calculate a comparison result for at least one of a phase, an amplitude, or an intensity between the input signal and the output signal corresponding to the input signal during a calibration operation of the signal processing device in which calibration signals are used as the plurality of input signals and are input to the plurality of amplifiers; and a controller configured to control whether or not the distortion compensation circuit executes the distortion compensation processing on the calibration signals based on the calculated comparison result.

7 Claims, 18 Drawing Sheets

(56)                References Cited

U.S. PATENT DOCUMENTS

2012/0224654 A1 *   9/2012  Nagatani ............... H03F 1/3247
                                                         375/297
2019/0356345 A1 *  11/2019  Ota ...................... H04B 1/0475

FOREIGN PATENT DOCUMENTS

JP         2018195955  A  *  12/2018
JP         2020-136772  A      8/2020
JP         2020-526150  A      8/2020
WO        2009/004733  A1     1/2009
WO        2018/061899  A1     4/2018

* cited by examiner

| (d1) | (c1) | (b1) | (a1) | (a2) | (b2) | (c2) | (d2) |
|------|------|------|------|------|------|------|------|
| 8 | 9 | 10 | 11 | 12 | 13 | 14 | 15 |
| 24 | 25 | 26 | 27 | 28 | 29 | 30 | 31 |
| 0 | 1 | 2 | 3 | 4 | 5 | 6 | 7 |
| 16 | 17 | 18 | 19 | 20 | 21 | 22 | 23 |

Fig. 6A

SIGNAL PROCESSING DEVICE, SIGNAL PROCESSING METHOD, AND NON-TRANSITORY COMPUTER READABLE MEDIUM FOR A DISTORTION COMPENSATION CIRCUIT

This application is a National Stage Entry of PCT/JP2021/041999 filed on Nov. 16, 2021, which claims priority from Japanese Patent Application 2020-217114 filed on Dec. 25, 2020, the contents of all of which are incorporated herein by reference, in their entirety.

TECHNICAL FIELD

The present invention relates to a signal processing device, a signal processing method, and a non-transitory computer readable medium.

BACKGROUND ART

A technology related to wireless communication such as 5th generation (5G) is in progress. In this technical field, compensating for distortion present in a signal is important to ensure accurate delivery of a signal content.

For example, Patent Literature 1 discloses an antenna device including a distortion compensation unit that compensates for distortion caused by a plurality of amplifiers. A detection unit of the antenna device detects, for example, amplitude modulation (AM)-AM distortion or AM-phase modulation (PM) distortion as a distortion characteristic of a power amplifier. The distortion compensation unit performs distortion compensation for the plurality of amplifiers based on the detection result.

Patent Literature 2 describes that a digital pre-distortion (DPD) module and a nonlinearity adjustment module of a correction device compensate for nonlinearity of a plurality of power amplifiers. The DPD module uniformly compensates for nonlinearity of the plurality of power amplifiers based on a DPD parameter. The nonlinear adjustment module also compensates for a portion of the nonlinearity of the power amplifiers that is not compensated by the DPD module based on an analog nonlinear correction parameter.

Patent Literature 3 discloses a dual-channel remote radio head unit in which a digital logic circuit generates a pre-distortion compensation signal suitable for each of power amplifiers. Further, Patent Literature 4 describes an RF power amplifier system in which an error between a signal input to a power amplifier 110 and a signal output from the power amplifier 110 is minimized by a pre-distorter.

CITATION LIST

Patent Literature

Patent Literature 1: Japanese Unexamined Patent Application Publication No. 2020-136772
Patent Literature 2: Published Japanese Translation of PCT International Publication for Patent Application, No. 2020-526150
Patent Literature 3: Published Japanese Translation of PCT International Publication for Patent Application, No. 2013-515424
Patent Literature 4: Published Japanese Translation of PCT International Publication for Patent Application, No. 2010-519862

SUMMARY OF INVENTION

Technical Problem

In a wireless communication system, a DPD compensation unit is provided upstream of an amplifier to suppress nonlinear distortion generated by the amplifier and expand a linear range of an output signal of the amplifier. However, depending on the amplifier, a memory effect may occur in the input/output characteristics. In this situation, when a calibration signal is input to the amplifier during a calibration operation of wireless communication setting, the calibration signal amplified and output by the amplifier reflects the memory effect. Therefore, there is a possibility that accurate calibration cannot be performed.

An object of the present disclosure is to provide a signal processing device, a signal processing method, and a non-transitory computer readable medium for enabling accurate calibration.

Solution to Problem

A signal processing device according to an aspect of the present example embodiment includes: a distortion compensation circuit configured to execute distortion compensation processing of compensating for nonlinear distortion on one or more input signals among a plurality of input signals, and output a signal subjected to the distortion compensation processing; a plurality of amplifiers configured to amplify the plurality of input signals including the signal output from the distortion compensation circuit and output the amplified signals as output signals; a calculation circuit configured to calculate, for each of the input signals, a comparison result for at least one of a phase, an amplitude, or an intensity between the input signal and the output signal corresponding to the input signal during a calibration operation of the signal processing device in which calibration signals are used as the plurality of input signals and are input to the plurality of amplifiers; and a controller configured to control whether or not the distortion compensation circuit executes the distortion compensation processing on the calibration signals based on the comparison result calculated by the calculation circuit.

A signal processing method performed by a signal processing device according to an aspect of the present example embodiment includes: executing distortion compensation processing of compensating for nonlinear distortion on one or more input signals among a plurality of input signals, and outputting a signal subjected to the distortion compensation processing; amplifying, by a plurality of amplifiers, the plurality of input signals including the signal subjected to the distortion compensation processing and outputting the amplified signals as output signals; calculating, for each of the input signals, a comparison result for at least one of a phase, an amplitude, or an intensity between the input signal and the output signal corresponding to the input signal during a calibration operation of the signal processing device in which calibration signals are used as the plurality of input signals and are input to the plurality of amplifiers; and controlling whether or not to execute the distortion compensation processing on the calibration signals based on the calculated comparison result.

A non-transitory computer readable medium according to an aspect of the present example embodiment stores a program for causing a signal processing device to perform: executing distortion compensation processing of compensating for nonlinear distortion on one or more input signals among a plurality of input signals, and outputting a signal subjected to the distortion compensation processing; amplifying, by a plurality of amplifiers, the plurality of input signals including the signal subjected to the distortion compensation processing and outputting the amplified signals as output signals; calculating, for each of the input signals, a comparison result for at least one of a phase, an amplitude, or an intensity between the input signal and the output signal corresponding to the input signal during a calibration operation of the signal processing device in which calibration signals are used as the plurality of input signals and are input to the plurality of amplifiers; and controlling whether or not to execute the distortion compensation processing on the calibration signals based on the calculated comparison result.

Advantageous Effects of Invention

According to the present disclosure, it is possible to provide the signal processing device, the signal processing method, and the non-transitory computer readable medium for enabling accurate calibration.

BRIEF DESCRIPTION OF DRAWINGS

FIG. 6A is a diagram illustrating an example of arrangement of antennas according to the related art.

EXAMPLE EMBODIMENT

First, a related art of the present application will be described. Hereinafter, an example of a wireless communication device in which time division duplex (TDD) is used as a communication method and multi user-multi input multi output (MIMO) is used for wireless transmission and reception will be described. In addition, in order to implement high frequency utilization efficiency, a technology of digital beamforming is used in this wireless communication device.

Figure 1:
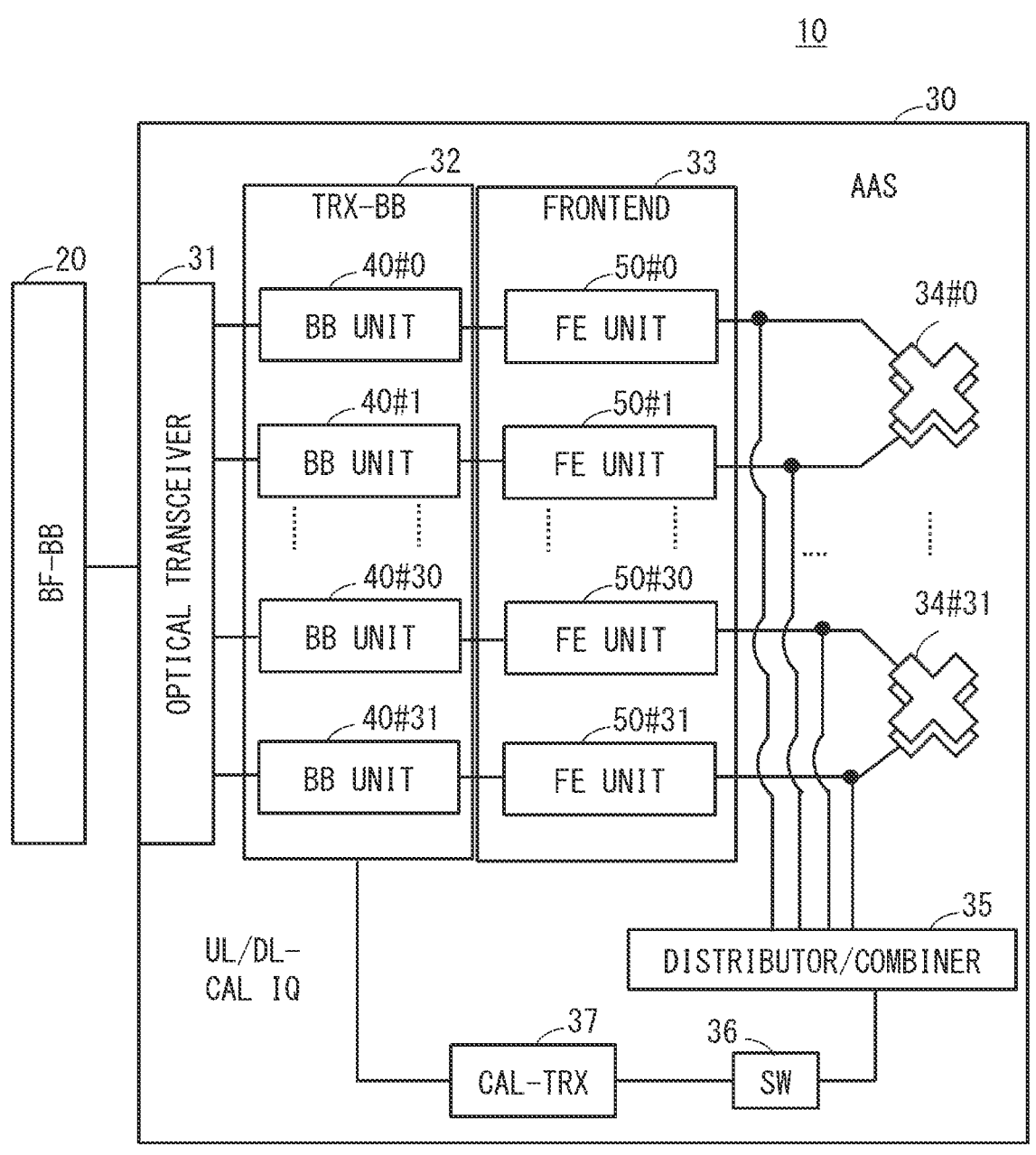
FIG. 1 is a block diagram illustrating an example of a wireless communication device according to a related art.

FIG. 1 is a block diagram illustrating an example of a wireless communication device 10 according to the related art. The wireless communication device 10 is a device mounted with an ultra-multi-element active antenna system (AAS) for 5G and provided in, for example, a base station. As illustrated in FIG. 1, the wireless communication device 10 includes a beamforming-baseband (BF-BB) unit 20 and an AAS unit 30. Here, the AAS unit 30 includes an optical transceiver 31, a TRX-BB unit 32, a frontend unit 33, 32 antennas 34, a wireless transmission unit (in the present example embodiment, 32 antennas and the transceiver have been described as an example, but arrangements and numbers other than the same number are also included within the scope of the disclosure), a distributor/combiner 35, a switch (SW) 36, and a calibration transceiver (CAL-TRX) 37, and a control unit (not illustrated) that controls these units. Note that uplink (UL) described below means a communication path from a user equipment (UE) (terminal) (not illustrated) to the wireless communication device 10, and downlink (DL) means a communication path from the wireless communication device 10 to the UE.

The BF-BB unit 20 is a baseband unit having a function of generating a beamforming signal. The BF-BB unit 20 stores a preset reception system characteristic [CAL-RX (fixed)] therein. In addition, when the wireless communication device 10 is activated and the BF-BB unit 20 stores a characteristic TX #n*[CAL-RX] of each signal channel acquired by a periodic operation of the TRX-BB unit 32 therein and updates the characteristic every time a new value is obtained. The BF-BB unit 20 performs communication in a DL direction by outputting a communication signal for communication to the AAS unit 30 by using these values. Details of this processing will be described below.

Next, each unit of the AAS unit 30 will be described. The optical transceiver 31 performs photoelectric conversion and reverse conversion of a signal (for example, a multi-layer signal) transmitted and received between the BF-BB unit 20 and the TRX-BB unit 32.

The TRX-BB unit 32 mediates the communication signal to be transmitted and received between the optical transceiver 31 and the frontend unit 33. In addition, the TRX-BB unit 32 generates a DL calibration signal (hereinafter, referred to as a DL-CAL signal), which is an IQ signal, during a DL calibration operation, and outputs the DL calibration signal to the CAL-TRX 37 via the frontend unit 33, the distributor/combiner 35, and the SW 36. Further, the TRX-BB unit 32 generates a UL-CAL signal (hereinafter, described as a UL-CAL signal), which is an IQ signal, during a UL calibration operation, and directly outputs the UL-CAL signal to the CAL-TRX 37. In this manner, the TRX-BB unit 32 functions as a transceiver baseband unit.

The TRX-BB unit 32 is a unit that mediates the communication signal to be transmitted and received between the optical transceiver 31 and the frontend unit 33, and includes 32 BB units 40 #0 to 40 #31. Hereinafter, the BB units 40 #0 to 40 #31 will be collectively referred to as the BB unit 40.

Figure 2:
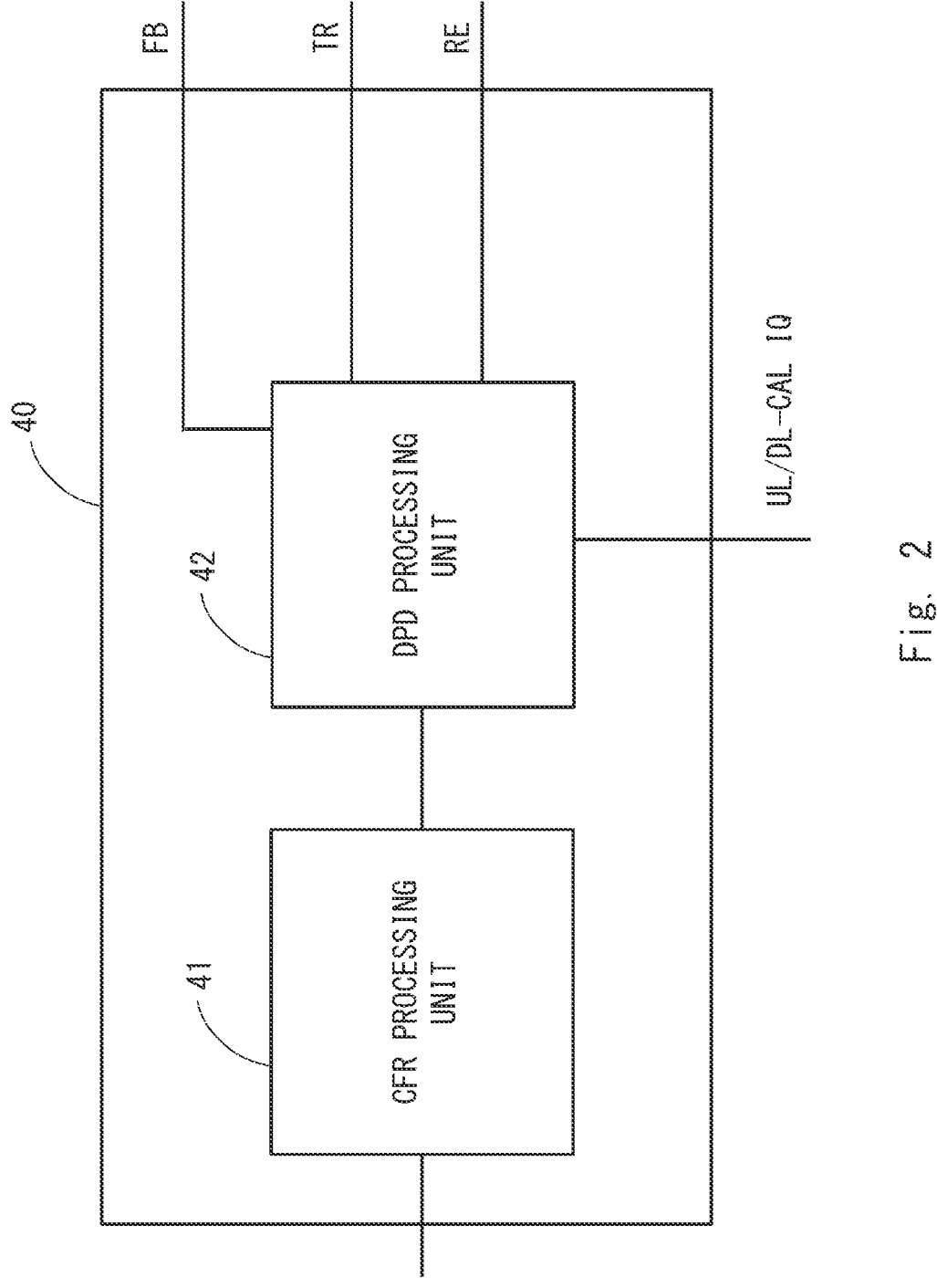
FIG. 2 is a block diagram illustrating an example of a BB unit according to the related art.

FIG. 2 is a block diagram of the BB unit 40. The BB unit 40 includes a CFR processing unit 41 and a DPD processing unit 42. Note that each of the BB units 40 #0 to 40 #31 has the same configuration as that illustrated in FIG. 2.

The CFR processing unit 41 limits a peak level of the IQ signal (multi-layer signal) output from the BF-BB unit 20 and input via the optical transceiver 31 by a CFR threshold (a threshold for suppressing the maximum peak component). Specifically, the CFR processing unit 41 suppresses a signal amplitude component exceeding the peak level set by the CFR threshold among amplitude components in the input multi-layer signal to the peak level set by the CFR threshold, and outputs the suppressed signal amplitude component to the DPD processing unit 42.

The reason why the peak level is suppressed by the CFR processing unit 41 is as follows. In a case where the peak level is not suppressed, there is a possibility that a transmission signal having a high peak level is output to a transmission amplifier downstream of the CFR processing unit 41. In this case, hard clipping occurs at a saturation output level of the transmission amplifier, so that a nonlinear distortion component of high-order cross modulation is generated, and the DPD processing unit 42 may be in a state of being unable to sufficiently compensate for the nonlinear distortion component. In order to avoid this situation, the CFR processing unit 41 limits the peak level of the transmission signal input to the transmission amplifier, and adjusts the transmission signal in such a way that an output level of the transmission amplifier does not exceed the saturation level.

The DPD processing unit 42 is provided between each CFR processing unit 41 and each TRX 51. The DPD processing unit 42 compares the IQ signal (multi-layer signal) output from the CFR processing unit 41 with an IR signal (multi-layer signal) which is output from the transmission amplifier 52 (transmission power amplifier) and then returned via a directional coupler 53 and a feedback (FB) path and to which nonlinear distortion based on nonlinearity of a transmission amplifier 52 is applied. As a result of this comparison, the DPD processing unit 42 performs compensation to give a weight obtained by inversely correcting the nonlinearity to the input signal in order to compensate for nonlinear distortion in input/output characteristics of AM-AM and AM-PM generated in the transmission amplifier 52. Note that the IR signal is represented as a signal FB in FIGS. 2 and 3.

The DPD processing unit 42 executes the DPD compensation processing of compensating for the amplitude and the phase of the IQ signal for wireless communication output from the CFR processing unit 41 based on the DPD compensation coefficient indicating a reverse characteristic to the input/output characteristic of the transmission amplifier 52 provided downstream, and outputs the signal subjected to the DPD compensation processing to a front end (FE) unit 50 as a TR signal. Since the DPD processing unit 42 is provided for each TRX 51, the DPD compensation processing based on the characteristic of the individual TRX 51 can be executed. The DPD compensation processing is executed to suppress nonlinear distortion radiation and improve a signal to interference plus noise ratio (SINR) performance of DL. An error vector magnitude (EVM) and an adjacent channel leakage ratio (ACLR) of the transmission amplifier 52 can be improved by the DPD compensation processing.

When the wireless communication device 10 is activated and a DL or UL calibration operation is periodically performed, the TRX-BB unit 32 determines and stores a calibration weight (hereinafter, referred to as CAL weight) for DL or UL. The DL/UL-CAL weight is a value for correcting variations in amplitude and phase of each TX or RX to be described below, and is determined by the DL/UL calibration operation based on the DL/UL-CAL signal. When the wireless communication device 10 transmits a spatial multiplexing signal including a plurality of layers by data beamforming, a beam of a radio wave output to a UE with which the wireless communication device 10 communicates may interfere with a UE (another UE) with which the wireless communication device 10 does not communicate. Therefore, it is preferable to reduce the interference. Therefore, when a beam pattern for transmitting data to a certain UE is formed and a beam is radiated from the wireless communication device 10, a null is formed as a pattern of the radiated beam in the direction of another UE. The DL calibration is performed to ensure a desired angle and depth of the null.

In a case of performing the DL calibration, the TRX-BB unit 32 generates the DL-CAL signal and transmits the DL-CAL signal to the CAL-TRX 37 via the frontend unit 33, the distributor/combiner 35, and the SW 36. The CAL-TRX 37 outputs the DL-CAL signal having passed through the inside to the TRX-BB unit 32. The TRX-BB unit 32 determines the DL-CAL weight to be applied to each signal channel by measuring a difference in amplitude and phase between the original DL-CAL signal and the DL-CAL signal received by the CAL-TRX 37 in order to inversely correct the difference.

In a case of performing the UL calibration, the TRX-BB unit 32 generates the UL-CAL signal and inputs the UL-CAL signal to the CAL-TRX 37. The CAL-TRX 37 inputs the UL-CAL signal having passed through a CAL network to a receiver RX of the TRX 51 via the SW 36 and the distributor/combiner 35. The receiver RX inputs the UL-CAL signal to the TRX-BB unit 32. The TRX-BB unit 32 determines the UL-CAL weight to be applied to the receiver RX of each TRX 51 by measuring a difference in amplitude and phase between the original UL-CAL signal and the UL-CAL signal transmitted by the CAL-TRX 37 in order to inversely correct the difference. In this manner, the TRX-BB unit 32 functions as a transceiver baseband unit. In FIGS. 1 and 2, the DL/UL-CAL signal, which is an IQ signal transmitted and received between the TRX-BB unit 32 (DPD processing unit 42) and the CAL-TRX 37, is displayed as DL/UL-CAL IQ.

Returning to FIG. 1, the description of the AAS unit 30 will be continued. The frontend unit 33 includes 32 FE units 50 #0 to 50 #31. Hereinafter, the FE units 50 #0 to 50 #31 will be collectively referred to as the FE unit 50.

Figure 3:
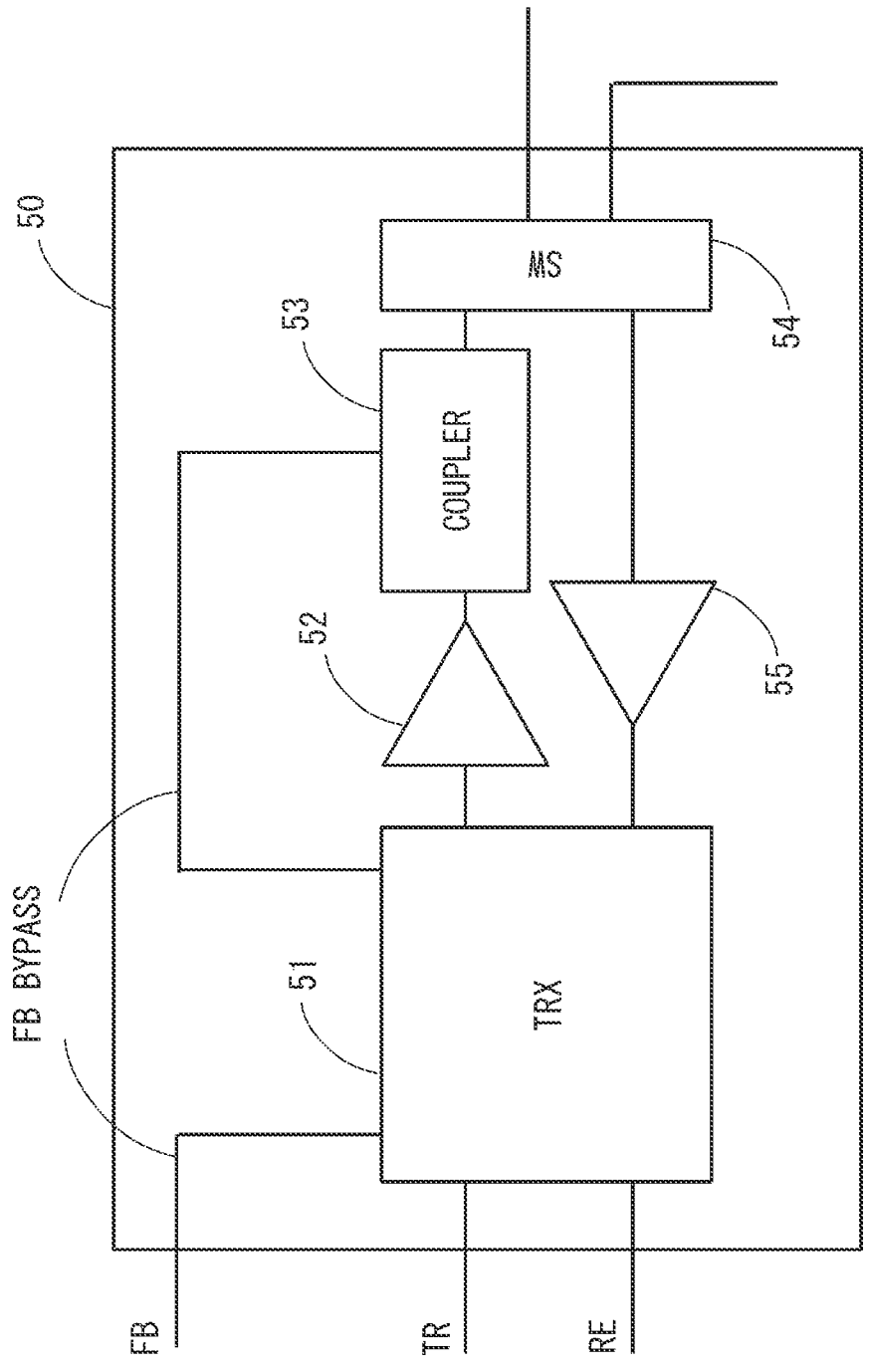
FIG. 3 is a block diagram illustrating an example of an FE unit according to the related art.

FIG. 3 is a block diagram of the FE unit 50. The FE unit 50 includes the TRX 51, the transmission amplifier (transmission power amplifier) 52, the directional coupler 53, an SW 54, and a reception amplifier (reception power amplifier) 55. Each of the FE units 50 #0 to 50 #31 has the same configuration as that illustrated in FIG. 3.

The TRX 51 is a transceiver and includes a transmitter TX and a receiver RX (not illustrated). The transmitter TX converts the IQ signal received from the TRX-BB unit 32 into the RF signal and outputs the RF signal to the antenna 34 or the CAL-TRX 37. In a case where the wireless communication device 10 transmits the wireless signal, the transmitter TX outputs the RF signal to the antenna 34, and in a case where the DL calibration is performed, the transmitter TX outputs the DL-CAL signal (RF signal) to the CAL-TRX 37 via the distributor/combiner 35.

In addition, the receiver TX converts the RF signal received from the antenna 34 or the CAL-TRX 37 into the IQ signal and outputs the IQ signal to the TRX-BB unit 32. In a case where the wireless communication device 10 receives the wireless signal from the UE, the TRX 51 receives the RF signal from the antenna 34. In a case where the UL calibration is performed, the TRX 51 receives the UL-CAL signal (RF signal) from the CAL-TRX 37 via the distributor/combiner 35. Then, the received UL-CAL signal is converted into the UL-CAL signal (IQ signal), and the converted UL-CAL signal is output to the BF-BB unit 20 via the TRX-BB unit 32.

Further, the TRX 51 has the FB path that outputs the signal FB output from the directional coupler 53 to the DPD processing unit 42 described above.

Each transmission amplifier 52 is arranged between each antenna 34 and the TRX 51 provided corresponding to each antenna 34. The transmission amplifier 52 amplifies the RF signal (the signal for wireless communication or the DL-CAL signal) output from the TRX 51 and outputs the amplified RF signal to the directional coupler 53.

Each directional coupler 53 is a coupler provided between each transmission amplifier 52 and each antenna 34. The directional coupler 53 outputs the RF signal output from each transmission amplifier 52 to the antenna 34 and outputs the RF signal to the corresponding TRX 51 via the FB path. The TRX 51 outputs the output RF signal to the DPD processing unit 42 via the FB path, and the DPD processing unit 42 receives the output RF signal and executes the above-described processing.

The SW 54 is a switch that switches a signal to be input to or output from the TRX 51 based on a control signal from the control unit of the AAS unit 30. That is, a connection destination of the frontend unit 33 is switched under the control of the AAS unit 30.

Specifically, in a case where the wireless communication device 10 performs wireless communication, the SW 54 is controlled in such a way that the frontend unit 33 and the antenna 34 are connected and the frontend unit 33 and the CAL-TRX 37 are not connected in each of the signal channels #0 to #31. As a result, the RF signal from the TRX 51 is output to the antenna 34 at the time of data transmission, and the SW 54 causes the RF signal from the antenna 34 to be output to the TRX 51 at the time of data reception.

On the other hand, in a case where the wireless communication device 10 performs the DL/UL calibration, the SW 54 is controlled in such a way that the frontend unit 33 and the CAL-TRX 37 are connected and the frontend unit 33 and the antenna 34 are not connected in each of the signal channels #0 to #31. In other words, while the TRX 51 and the distributor/combiner 35 are connected, the antenna 34 and the TRX 51 are disconnected. In a case where the wireless communication device 10 performs the DL calibration, the DL-CAL signal output from the transmission amplifier 52 is input to the distributor/combiner 35. In a case where the wireless communication device 10 performs the UL calibration, the UL-CAL signal output from the distributor/combiner 35 is input to the reception amplifier 55.

The wireless communication device 10 controls each SW 54 to avoid the DL/UL-CAL signal processed by each TRX 51 from being affected by interference from other systems. That is, since an interference component is not included in the DL/UL-CAL signal processed by each TRX 51, the AAS unit 30 can accurately determine the CAL weight to be applied to each TRX 51. Once the DL/UL calibration is completed, the control unit of the AAS unit 30 controls each SW 54 in such a way that each TRX 51 and each antenna 34 are connected.

Each reception amplifier 55 amplifies the input RF signal (the signal for wireless communication or the UL-CAL signal) and outputs the amplified RF signal to the corresponding TRX 51.

Returning to FIG. 1, the description of the AAS unit 30 will be continued. The antenna 34 is an antenna provided corresponding to each TRX 51, each transmission amplifier 52, and each reception amplifier 55. The antennas 34 are dual-polarized antennas with polarizations of +45 degrees and −45 degrees orthogonal to each other, and four sets of eight antennas, that is, a total of 32 antennas are provided. However, since dual polarization is achieved with one antenna element, the number of antennas corresponds to 64. Each antenna 34 wirelessly transmits the RF signal received from each FE unit 50 to one or a plurality of UEs. At least one of a filter or a duplexer may be appropriately provided upstream of each antenna 34.

In a case where the wireless communication device 10 performs the DL calibration, the distributor/combiner 35 combines the DL-CAL signal output from each SW 54, and outputs the combined DL-CAL signal to the SW 36. In addition, in a case where the UL calibration is performed, the distributor/combiner 35 distributes the UL-CAL signal output from the SW 36 and outputs the distributed UL-CAL signal to each SW 54.

The SW 36 is a switch that switches a signal direction. In a case where the wireless communication device 10 performs the DL calibration, the SW 36 causes the DL-CAL signal output from the distributor/combiner 35 to be output to the SW 36. In a case where the wireless communication device 10 performs the UL calibration, the SW 36 causes the UL-CAL signal output from the SW 36 to be output to the distributor/combiner 35.

In a case where the wireless communication device 10 performs the DL calibration, the CAL-TRX 37 converts the DL-CAL signal (RF signal) output from the SW 36 into the DL-CAL signal (IQ signal). Then, the converted DL-CAL signal is output to the TRX-BB unit 32.

In addition, in a case where the wireless communication device 10 performs the UL calibration, the CAL-TRX 37 converts the UL-CAL signal (IQ signal) output from the TRX-BB unit 32 into the UL-CAL signal (RF signal), and outputs the converted UL-CAL signal to the SW 36. Note that the CAL-TRX 37 may include a transmitter and a receiver similarly to the TRX 51.

Hereinafter, the DL calibration operation and the UL calibration operation of the wireless communication device 10 will be described. During the calibration operation described below, each DPD processing unit 42 is turned off, and the DPD compensation processing is not executed.

<DL Calibration Operation>

First, the DL calibration operation will be described. First, the TRX-BB unit 32 outputs a preset DL-CAL signal (IQ signal) to the frontend unit 33. (The transmitter TX of) each TRX 51 in the frontend unit 33 converts the DL-CAL signal (IQ signal) into the DL-CAL signal (RF signal). The DL-CAL signal (RF signal) converted by each TRX 51 is output to the distributor/combiner 35 via the transmission amplifier 52 and the SW 54 and combined by the distributor/combiner 35. The DL-CAL signal combined by the distributor/combiner 35 is input to the CAL-TRX 37 via the SW 36. Note that the AAS unit 30 may output the DL-CAL signal at a timing different for each signal channel.

The CAL-TRX 37 converts the received DL-CAL signal (RF signal) into the DL-CAL signal (IQ signal) and outputs the converted DL-CAL signal to the TRX-BB unit 32. The DL-CAL signal transmitted from the CAL-TRX 37 is in a state where the DL-CAL signal transmitted from each TRX 51 #n is synthesized by frequency multiplexing. Therefore, the TRX-BB unit 32 performs frequency separation on the DL-CAL signal transmitted from the CAL-TRX 37 by fast Fourier transform (FFT), extracts the DL-CAL signal for each of the signal channels #0 to #31, and calculates the DL-CAL weight.

Specifically, the TRX-BB unit 32 measures the difference in amplitude and phase between the DL-CAL signal of the DL-CAL signal transmitted for each signal channel and the original DL-CAL signal (that is, before transmission), thereby learning the variation in amplitude and phase of the DL-CAL signal for each signal channel. The TRX-BB unit 32 calculates the DL-CAL weight of each TRX 51 #n based on the learning result.

Here, the DL-CAL weight of each TRX 51 #n is obtained by multiplying a transmission system characteristic (amplitude and phase characteristic) [TX #n] of the TRX 51 #n and a reception system characteristic (amplitude and phase characteristics) [CAL-RX] of the CAL-TRX 37 as expressed by the following Formula 1.

$$DL \text{ calibration weight} = [TX \text{ #}n] \times [CAL\text{-}RX] \quad \text{[Mathematical Formula 1]}$$

The DL calibration learning is completed in this manner. The BF-BB unit 20 stores the DL-CAL weight therein. Thereafter, during the wireless communication related to normal DL, the BF-BB unit 20 outputs a DL signal weighted by the above-described DL-CAL weight for each TRX 51 to each TRX 51.

Next, an operation example of a DL operation of the AAS unit 30 will be described. The BF-BB unit 20 generates a BF signal (IQ signal) by an internal circuit. Then, the generated BF signal is corrected with the above-described DL-CAL weight for each of the signal channels #0 to #31 and then output to the TRX-BB unit 32 via the optical transceiver 31.

The optical transceiver 31 does not have to be provided between the BF-BB unit 20 and the TRX-BB unit 32, and the BF-BB unit 20 and the TRX-BB unit 32 may be directly connected. In this case, the BF-BB unit 20 is connected to an external distribution unit (DU) via an optical transceiver.

Specifically, the BF-BB unit 20 multiplies the BF signal by a fraction having the DL-CAL weight as a denominator and the fixed reception system characteristic [CAL-RX (fixed)] of the CAL-TRX 37 as a numerator. The corrected BF signal is expressed by the following Formula 2. Note that [CAL-RX (fixed)] is stored in advance in a storage unit (not illustrated) of the BF-BB unit 20.

$$BF \times \frac{[CAL - RX \text{ (Fixed)}]}{[TX \text{ #}n] \times [CAL - RX]} \quad \text{[Mathematical Formula 2]}$$

The corrected BF signal is converted from the IQ signal into the RF signal by each TRX 51 #n of the TRX-BB unit 32 and transmitted, amplified by each transmission amplifier 52 #n, and output from the frontend unit 33. Since the BF signal output from the frontend unit 33 passes through each TRX 51 #n, the BF signal is expressed as the following Formula 3.

$$BF \times \frac{[CAL - RX \text{ (Fixed)}]}{[TX \text{ #}n] \times [CAL - RX]} \times [TX \text{ #}n] \quad \text{[Mathematical Formula 3]}$$

In addition, Formula 3 is expressed simply by deleting [TX #n] as the following Formula 4 below.

$$BF \times \frac{[CAL - RX \text{ (Fixed)}]}{[CAL - RX]} \quad \text{[Mathematical Formula 4]}$$

In Formula 4, if [CAL-RX (fixed)]=[CAL-RX], the BF signal is in an ideal state, and the BF signal in the ideal state is transmitted from each antenna 34 #n. Note that stability of the CAL-RX is important in order to satisfy [CAL-RX (fixed)]=[CAL-RX].

By performing the above operation, it is possible to compensate for a variation in amplitude and phase identification of each transmitter TX #n. With the DL calibration operation, when a multi-layer spatial multiplexing wireless signal is transmitted by data beamforming, the angle and depth of a null formed toward another UE can be accurately set. In addition, it is also possible to suppress generation of nonlinear distortion radiation caused by third-order intermodulation distortion in each direction of the space.

Note that the update of the DL-CAL weight described above may be performed between transmission of the wireless signal by fan beamforming (a beam pattern shape equivalent to omni-directional broad beamforming) and transmission of the wireless signal by data beamforming as described below. Alternatively, the DL-CAL weight may be updated periodically. As still another example, the wireless communication device 10 may update the DL-CAL weight with detection of an environment change (for example, a temperature change) or a signal change over time by a sensor of the wireless communication device 10 as a trigger. The update cycle in this case is, for example, one minute or more.

<UL Calibration Operation>

Next, the UL calibration operation will be described. The TRX-BB unit 32 directly outputs a preset UL-CAL signal (IQ signal) to the CAL-TRX 37. The CAL-TRX 37 converts the UL-CAL signal (IQ signal) into the UL-CAL signal (RF signal). The UL-CAL signal (RF signal) converted by the CAL-TRX 37 is output to the distributor/combiner 35 via the SW 36 and distributed by the distributor/combiner 35. The UL-CAL signal distributed by the distributor/combiner 35 is output to each TRX 51 via each SW 54 and the reception amplifier 55. Each TRX 51 converts the UL-CAL signal (RF signal) into the UL-CAL signal (IQ signal) and outputs the converted UL-CAL signal to the TRX-BB unit 32.

The TRX-BB unit 32 measures a difference in amplitude and phase between the UL-CAL signal of the UL-CAL signal received by each TRX 51 and the original UL-CAL signal, and learns a variation in amplitude and phase of the UL-CAL signal. The TRX-BB unit 32 calculates the UL-CAL weight of each TRX 51 based on the learning result.

The UL calibration operation is completed in this manner. The BF-BB unit 20 stores the UL-CAL weight therein. Thereafter, during the wireless communication related to normal UL, the BF-BB unit 20 outputs a UL signal weighted by the above-described UL-CAL weight for each TRX 51 to each TRX 51.

<Calibration Execution Timing>

Next, DL and UL calibration execution timings will be described. As described above, the wireless communication device 10 is a wireless communication device compatible with a TDD mode (TDD communication method). The TDD mode is a communication method in which transmission and reception are performed by temporally switching between DL communication and UL communication using the same frequency in uplink and downlink (UL/DL). A DL subframe is transmitted in DL communication, and a UL subframe is transmitted in UL communication. In addition, a special subframe is transmitted at a timing at which switching from the DL communication to the UL communication is made. The special subframe is a subframe including a downlink pilot time slot (DwPTS), an uplink pilot time slot (UpPTS), and a guard period (GP). The DwPTS is a field reserved for the DL communication, the UpPTS is a field reserved for the UL communication, and the GP is a field in which the DL communication and the UL communication are not performed.

In the wireless communication device 10, in a time period of the guard period (GP) in which the DL communication and the UL communication are not performed, both the transmitter TX and the receiver RX in the TRX 51 are exclusively in an OFF/ON state. For example, the wireless communication device 10 performs at least one of the DL calibration or the UL calibration in the time period of the GP of the special subframe.

<Transmitter Power Level During Calibration Execution>

Figure 4:
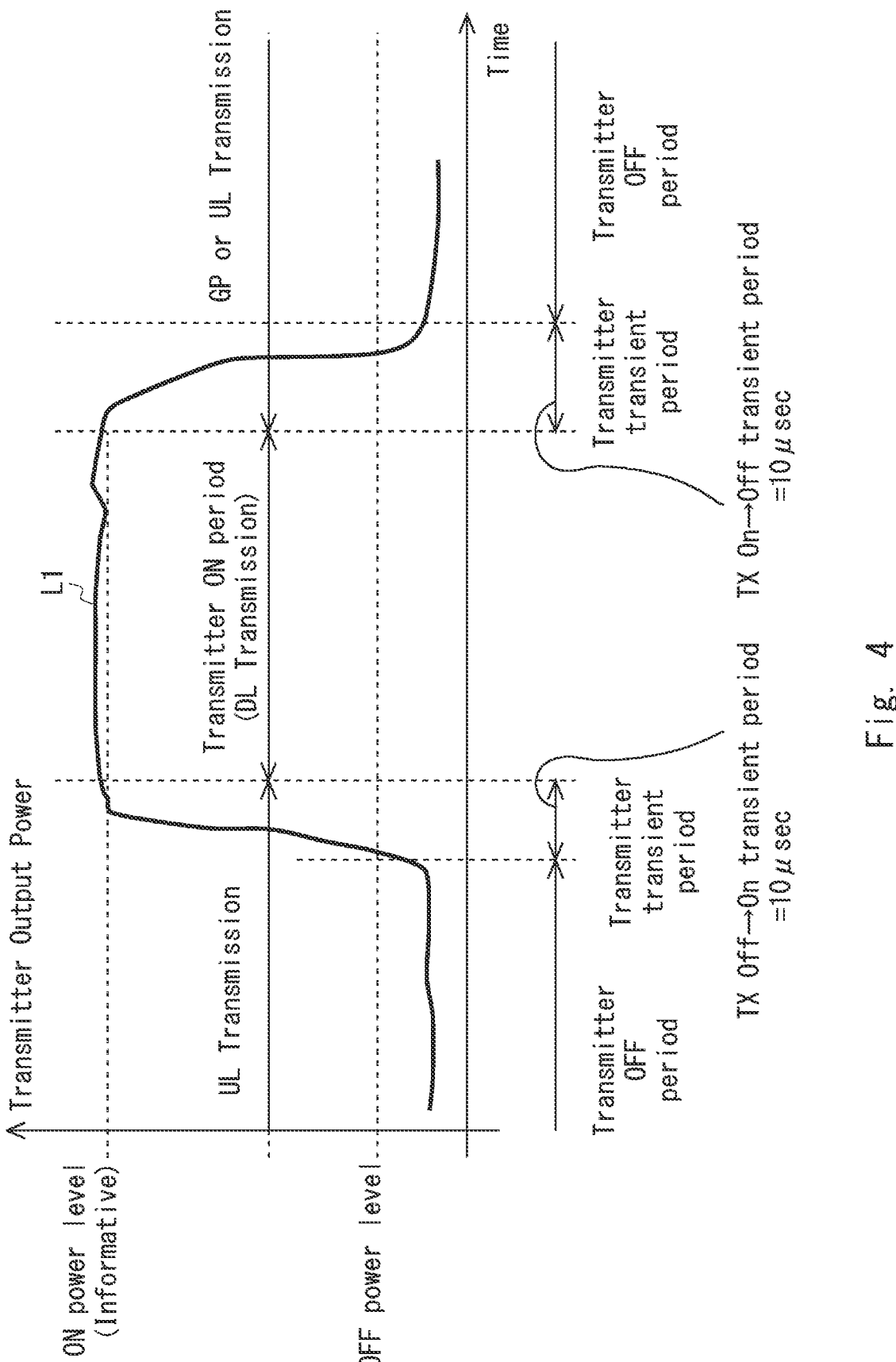
FIG. 4 is a graph illustrating an example of a power level of a transmitter in the wireless communication device according to the related art.

FIG. 4 illustrates a power level of the transmitter TX at each of a DL timing and a UL timing. In FIG. 4, the horizontal axis represents time, and the vertical axis represents the power level. A solid line L1 in FIG. 4 indicates transition of the transmission power level of the transmitter TX of the wireless communication device 10. It can be seen from FIG. 4 that the transmission power level that was an OFF power level in the initial transmitter OFF period becomes an ON power level in a transmitter ON period through a transmitter transient period, and becomes the OFF power level in the transmitter OFF period through the transmitter transient period again. In FIG. 4, a time period described as UL transmission indicates a time period of the UL communication. In addition, a time period described as the DL transmission indicates a time period of the DL communication. In addition, a time period described as the GP or the UL transmission indicates a time period of the GP or the UL communication.

The wireless communication device 10 performs the DL calibration or the UL calibration in the time period (transmitter transient period) of the GP of the special subframe. This time period is included in a period of an uplink-downlink frame timing. In the GP, (a) a time period in which the transmitter TX transitions from an OFF state to an ON state and (b) a time period in which the transmitter TX transitions from the ON state to the OFF state are, for example, 10 μs. The wireless communication device 10 can perform the above-described DL calibration or UL calibration in at least one of the period (a) or the period (b). That is, in this example, an output time of the DL/UL-CAL signal may be within 10 μs. The main purpose of the calibration is to unify the frequency characteristics of the amplitude and the phase in a linear region between the 32 TRXs. Therefore, it is important to lower the power of the DL/UL-CAL signal to a level at which a required signal-to-noise ratio (SNR) can be secured at the maximum rating or less, so that the DL/UL-CAL signal does not undergo nonlinear deterioration. In this manner, the DL-CAL weight is periodically calculated in the time period of the GP and stored in the BF-BB unit 20.

<Frequency Arrangement of DL-CAL Signal>

Further, an example of frequency arrangement of the DL-CAL signal whose frequency is orthogonal for each TRX #n will be described. Here, as illustrated in FIG. 1, an example of the frequency arrangement of the DL-CAL signal for each transmitter TX #n in a case where 32 TRXs #n are provided will be described.

Figure 5:
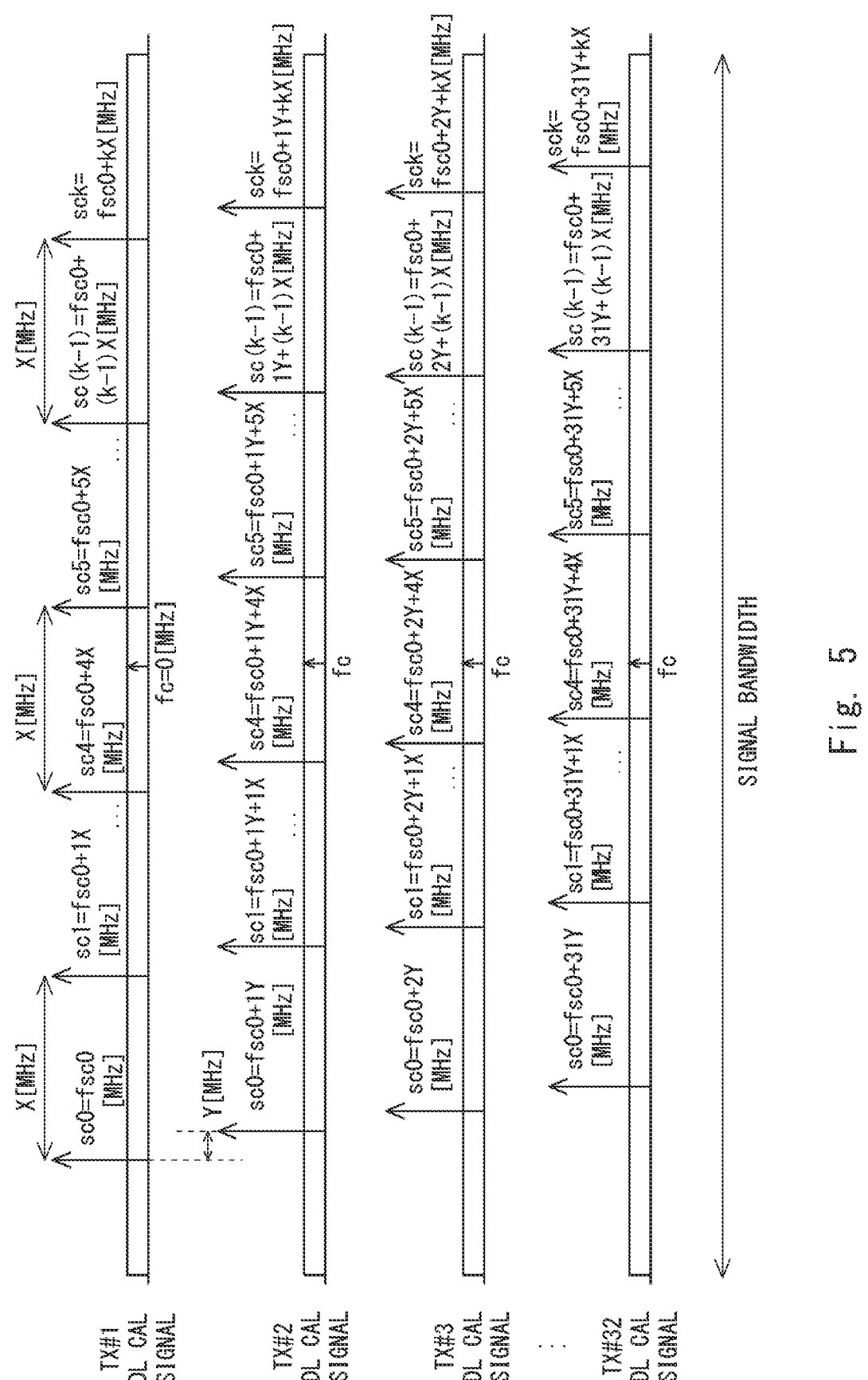
FIG. 5 is a diagram illustrating an example of frequency arrangement of a DL calibration signal for each transmitter according to the related art.

An example of the frequency arrangement of the DL-CAL signal for each transmitter TX #n will be described with reference to FIG. 5. FIG. 5 illustrates the frequency arrangement of the DL-CAL signal for each transmitter TX #n.

In FIG. 5, in the frequency arrangement of the DL-CAL signal of one transmitter TX #n, subcarriers used to transmit the DL-CAL signal are arranged at an interval of X [MHz]. The frequency arrangement of the DL-CAL signal is shifted by Y [MHz] in a frequency direction between adjacent transmitters TX #n. Note that fs0 [MHz] is a reference frequency.

Here, in the example illustrated in FIG. 5, it is necessary to satisfy the following two frequency arrangement conditions A1 and A2.

Frequency arrangement condition A1:

X [MHz]>Y [MHz]×(the number of transmitters TX #n−1) holds.

Frequency arrangement condition A2:

A frequency "sc0=fs0 [MHz]" of the lowermost subcarrier sc0 of the DL-CAL signal for a transmitter TX #1 to a frequency "sck=fsc0+31Y+kX [MHz]" of the uppermost subcarrier sck of the DL-CAL signal for a transmitter TX #31 are within a range of the signal bandwidth.

Next, problems related to the related art will be described. FIG. 6A illustrates an example of arrangement of the antennas 34 #0 to 34 #31 in the related art. Eight antennas 34 are arranged in four rows, and the antennas 34 in the same row in FIG. 6A output the same wireless signal. For example, four antennas belonging to (a1), (a2), (b1), (b2), (c1), (c2), (d1), and (d2) in FIG. 6A output the same wireless signal. Therefore, radio wave intensities of the four antennas in these columns are substantially the same.

The antennas 34 #0 to 34 #31 can transmit a wireless signal by fan beamforming and transmit a wireless signal by data beamforming, for example. Here, transmitting a wireless signal by fan beamforming means transmitting a wireless signal having a substantially constant intensity in a range of a predetermined angle between the front side of the wireless communication device 10 and a horizontal direction from the front surface, and is used for broadcast data transmission, for example. On the other hand, transmitting a wireless signal by data beamforming means transmitting a wireless signal having a high intensity with respect to the front side of the wireless communication device 10 or a certain angular direction in the horizontal direction and transmitting a wireless signal having a low intensity while forming a null toward another UE. This wireless signal transmission method is used for data communication with respect to a specific UE.

In a case where the antennas 34 #0 to 34 #31 transmit wireless signals by fan beamforming, for example, (a1) and (a2) output wireless signals of the maximum rating, and (b1) and (b2), (c1) and (c2), (d1) and (d2) output wireless signals having a higher radio wave intensity in this order. That is, the intensity of the output wireless signal decreases as the distance to the center portion of the antenna illustrated in FIG. 6A increases. As an example, the BF-BB unit 20 outputs an input signal of −14 dBFS (average) at maximum to the transmission amplifiers 52 corresponding to (a1) and (a2), and outputs an input signal of −24 dBFS (average) at maximum to the transmission amplifiers 52 corresponding to (b1) and (b2).

The phases of the input signals of the transmission amplifiers 52 corresponding to (a1), (a2), (c1), and (c2) are the same, and the phases of the input signals of the transmission amplifiers 52 corresponding to (b1), (b2), (d1), and (d2) are obtained by inverting the phases of the transmission amplifiers 52 corresponding to (a1), (a2), (c1), and (c2).

Figure 6B:
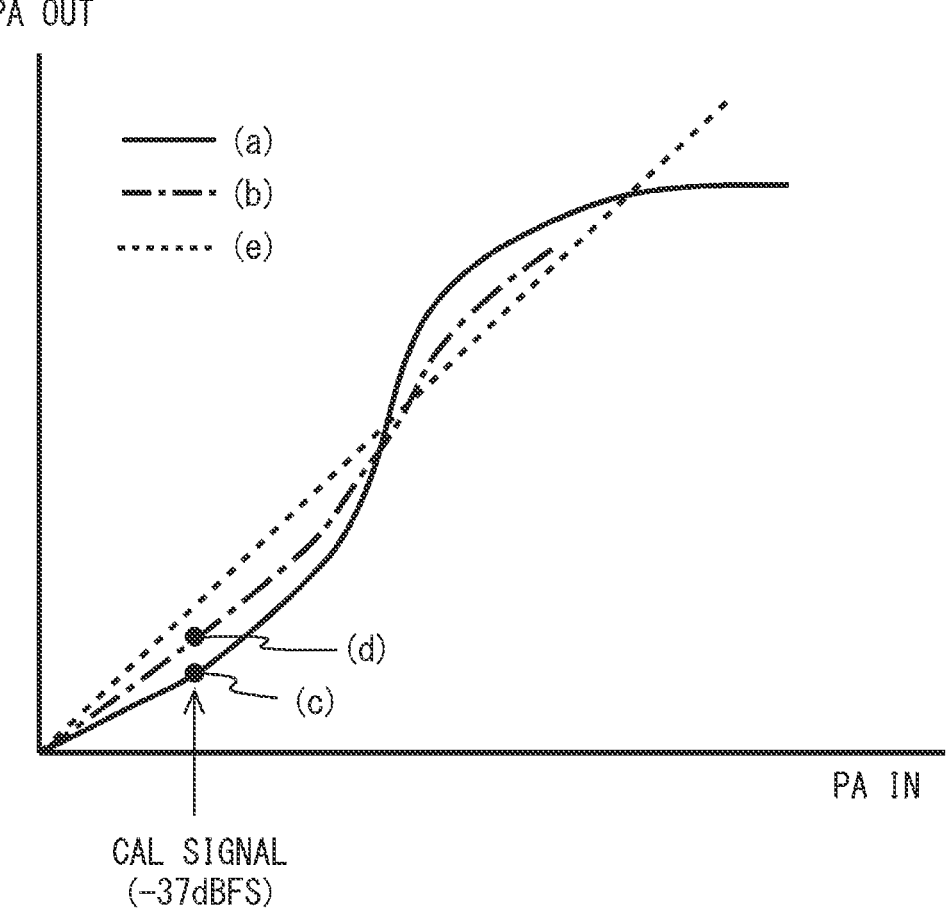
FIG. 6B is a graph illustrating an example of AM-AM input/output characteristics of a transmission amplifier according to the related art.

FIG. 6B is a graph illustrating an example of the AM-AM input/output characteristics of the transmission amplifiers 52 corresponding to the antennas 34 of (a1), (a2), (b1), and (b2) of FIG. 6A. The horizontal axis in FIG. 6B represents the amplitude of the input signal, and the vertical axis in FIG. 6B represents the amplitude of the output signal. The input/output characteristics of the transmission amplifiers 52 corresponding to (a1) and (a2) are represented by (a) of FIG. 6B, and the input/output characteristics of the transmission amplifiers 52 corresponding to (b1) and (b2) are represented by (b) of FIG. 6B. In addition, an ideal input/output characteristic of the transmission amplifier 52 is linear and is represented by (e) of FIG. 6B. The input/output characteristics (a) and (b) of the transmission amplifier 52 are not compensated by each DPD processing unit 42. In addition, a case where the memory effect (a phenomenon in which the AM-AM characteristic and the AM-PM characteristic change according to the input/output level when passing through the transmission amplifier in the past time zone and are held for a certain period of time) occurs in the AM-AM characteristic or the AM-PM characteristic of the transmission amplifier 52 will be considered. At this time, in a case where a signal of −37 dBFS (average) is input to the transmission amplifier 52 as the DL-CAL signal as the input signal, (c) and (d) are points indicating the corresponding output signal in the input/output characteristics (a) and (b).

As illustrated in FIG. 6B, the input/output characteristics (a) and (b) have nonlinearity deviated from the ideal input/output characteristic. In particular, the input/output characteristic (a) has larger nonlinearity than the input/output characteristic (b). Then, the DL-CAL signal having a small amplitude (intensity) is input to each transmission amplifier 52.

In addition, similarly to the AM-AM input/output characteristic, a phase difference (AM-PM input/output characteristic) between the input signal and the output signal of the transmission amplifier 52 is also significant when compared with the ideal input/output characteristic (a characteristic in which the phase difference becomes 0). This difference increases in the order of (a1) and (a2), (b1) and (b2), (c1) and (c2), and (d1) and (d2).

The distortion based on the nonlinearity described above is originally eliminated by changing the signal input to the transmission amplifier 52. However, in a case where the transmission amplifier 52 is a Doherty amplifier (for example, a gallium nitride amplifier), the memory effect may occur in the AM-AM input/output characteristic and the AM-PM input/output characteristic. In this case, even though the input signal has changed, the transmission amplifier 52 outputs the output signal based on the input/output characteristic related to the input signal before the change for a while due to the memory effect occurring in itself.

In particular, in a case where the wireless communication device 10 transmits a wireless signal by fan beamforming, then performs DL calibration, and then transmits a wireless signal by data beamforming, the following problems occur. At the time of transmitting a wireless signal by fan beamforming, the output of the transmission amplifier 52 varies in intensity from the maximum rating to a low signal intensity. The distortion based on the nonlinearity of each transmission amplifier 52 at this stage is compensated by the corresponding DPD processing unit 42.

In a case where the DL calibration is performed after the wireless communication device 10 transmits (radiates) a wireless signal by the data beamforming, the DL-CAL signal output from the BF-BB unit 20 has substantially the same output level between the transmitters, unlike a case of fan beamforming. However, due to the memory effect of the transmission amplifier 52, when passing through each transmission amplifier 52, the characteristics of AM-AM and AM-PM determined by the input/output characteristic at the time of fan beamforming affect the DL-CAL signal output from each transmitter.

As an example, a signal having an average level of −37 dBFS is assumed as the DL-CAL signal. 0 dBFS corresponds to a full scale (the maximum output level) of a transmission digital analog converter (DAC). As described above, in a case where the DL-CAL signal is input to the transmission amplifier 52 in a state where the memory effect has occurred, in FIG. 6B, (c) and (d) are points indicating the corresponding output signal for the input/output characteristics (a) and (b), and a difference in gain from the ideal input/output characteristic is generated. In addition, it is assumed that, during the DL calibration operation using the DL-CAL signal, the wireless communication device 10 learns the frequency characteristics of the amplitude and the phase of each transmitter in a linear region without nonlinearity, and corrects a difference in each frequency characteristic in a unified manner. Therefore, since the DPD processing unit 42 is turned off, the distortion due to the nonlinearity of each transmission amplifier 52 is not compensated by the corresponding DPD processing unit 42. Therefore, during the DL calibration operation, the DL-CAL weight is set in such a way as to compensate for the difference in amplitude and phase between the transmitters caused by the memory effect.

In the next data slot, when the wireless communication device 10 transmits a wireless signal by data beamforming, the output of each transmission amplifier 52 is at the maximum rating to transmit data to the UE. That is, the wireless signal output from the BF-BB unit 20 has substantially the same amplitude for each signal channel. In addition, when a wireless signal by data beamforming is transmitted, each DPD processing unit 42 is turned on, and thus, each DPD processing unit 42 tries to compensate for the distortion caused by the nonlinearity of the corresponding transmission amplifier 52.

However, as described above, what is set in the previous DL calibration is the DL-CAL weight reflecting the history of fan beamforming. Therefore, although the output signal in each transmission amplifier 52 should originally have substantially the same amplitude, the amplitude is different for each transmission amplifier 52 due to an unnecessary DL-CAL weight. In addition, a phase difference that should not originally exist is also generated for each transmission amplifier 52. In this way, overcompensation or insufficient compensation occurs for the amplitude and phase of the wireless signal by data beamforming. This phenomenon continues until the DL-CAL weight is updated.

Figure 7A:
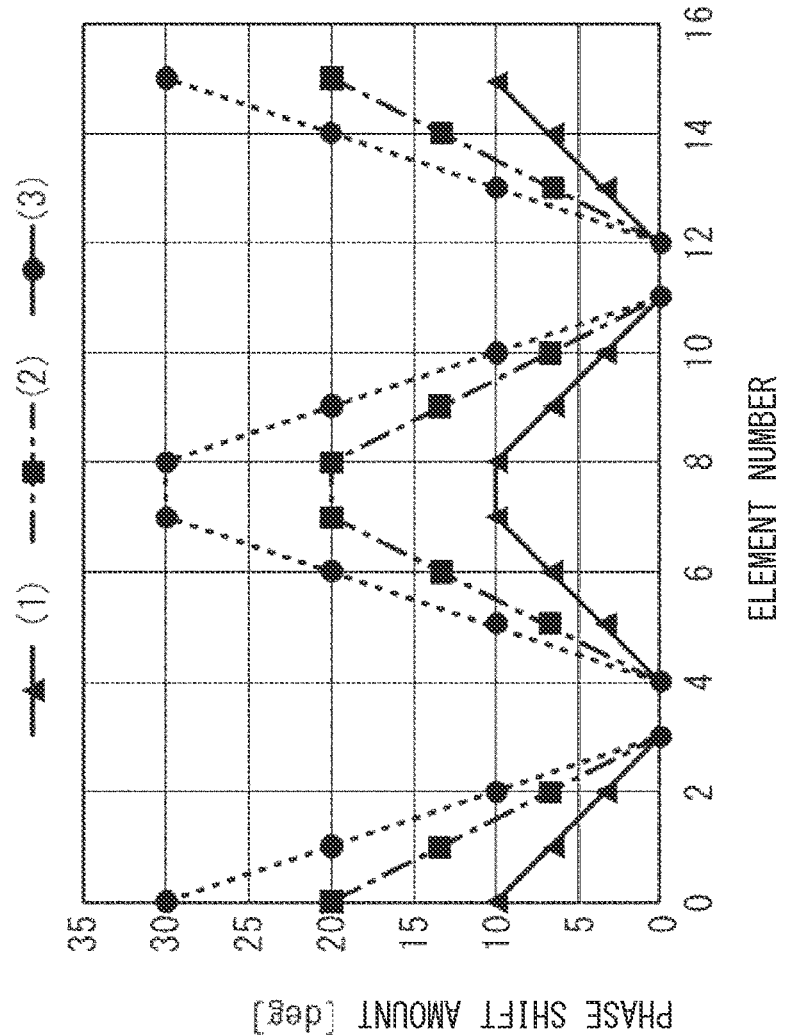
FIG. 7A is a graph illustrating an example of a phase difference between signal channels according to the related art.

FIG. 7A is a graph illustrating an example of the phase difference of each signal channel. The horizontal axis of the graph in FIG. 7A represents a number of the transmission amplifier 52, and the vertical axis of the graph represents a phase difference amount from the transmission amplifiers 52 #3, 52 #4, 52 #11, and 52 #12 (corresponding to (a1) and (a2) of FIG. 6). FIG. 7A illustrates a phase shift amount between wireless signals of data beamforming output from the transmission amplifiers 52 in a case where the wireless signal is transmitted in a state where the wireless signal is corrected using unnecessary DL-CAL weight by the above-described processing in the configuration of the antenna 34 illustrated in FIG. 6A. Although FIG. 7A illustrates the phase difference amounts of the transmission amplifiers 52 #0 to 52 #15, the same graph as that of FIG. 7A is applied also to phase difference amounts of the transmission amplifiers 52 #16 to 52 #31 (phase difference amounts from transmission amplifiers 52 #19, 52 #20, 52 #27, and 52 #28).

FIG. 7A illustrates a case where the phase difference between the transmitters is a maximum of 11.6 degrees phase-phase (p-p) in (1), a maximum of 23.1 degrees p-p in (2), and a maximum of 34.6 degrees p-p in (3) in a case where the memory effect is statistically present within a range of ±3 σ (where σ is a standard deviation). The influence of the phase difference on data beamforming was verified by the following calculation. As can be understood by referring to FIG. 7A, the phase difference amounts of the transmission amplifiers 52 corresponding to the antennas 34 of (d1) and (d2) in FIG. 6A are the largest, followed by the phase difference amounts of the transmission amplifiers 52 corresponding to (c1) and (c2) and the transmission amplifiers 52 corresponding to (b1) and (b2).

Figure 7B:
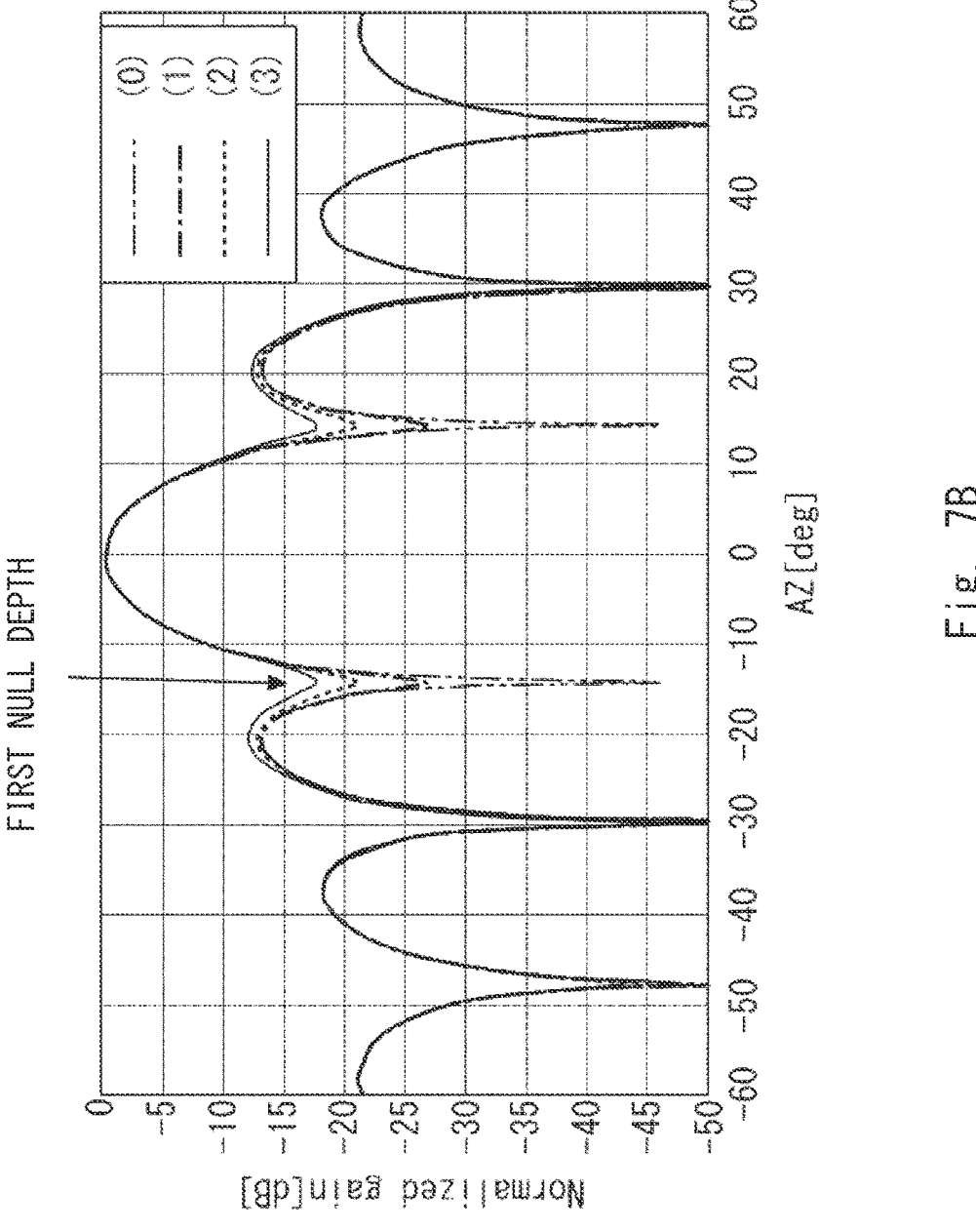
FIG. 7B is a graph illustrating an example of an angle spectrum of a horizontal radiation pattern at the time of wireless signal output according to data beamforming in the related art.

FIG. 7B is a graph illustrating an example of an angle spectrum of a horizontal radiation pattern at the time of wireless signal output according to data beamforming. The horizontal axis of the graph in FIG. 7B represents the angle in the horizontal direction (left-right direction) from the front side of the wireless communication device 10, and the vertical axis of the graph represents a normalized radiation power level with reference to the output signal from the front side of the wireless communication device 10. (1) to (3) of FIG. 7B are graphs illustrating an angle spectrum in a case where the phase differences of (1) to (3) of FIG. 7A exist, and (0) of FIG. 7B illustrates the original angle spectrum in which there is no unnecessary DL-CAL weight.

As can be understood by referring to FIG. 7B, the depth (first null depth) of a null point existing closest to the front side of the wireless communication device 10 is 46 dB in (0), 27 dB in (1), 21 dB in (2), and 17 dB in (3). That is, the greater the phase difference, the smaller the null depth. That is, the DL SINR in each UE direction at the time of spatial multiplexing signal transmission is degraded by this shallow null (meaning interference waves in beamforming to another UE). The null depth determines the MU-MIMO performance of the wireless communication device 10. Therefore, the throughput of a cell when the wireless communication device 10 functions as a base station is not improved, and communication quality is deteriorated.

The present disclosure describes a configuration capable of suppressing SINR degradation to prevent the problem that, in a case where the memory effect occurs in the nonlinear characteristic of the amplifier, the memory effect degrades the accuracy of calibration, and the SINR degradation of a signal transmitted to each terminal at the time of spatial multiplexing signal transmission occurs. As a specific example, even in a case where the wireless communication device transmits a wireless signal by fan beamforming, then performs the DL calibration, and then transmits a wireless signal by data beamforming, it is possible to suppress deterioration in quality of wireless communication by data beamforming according to the present disclosure.

First Example Embodiment

Figure 8:
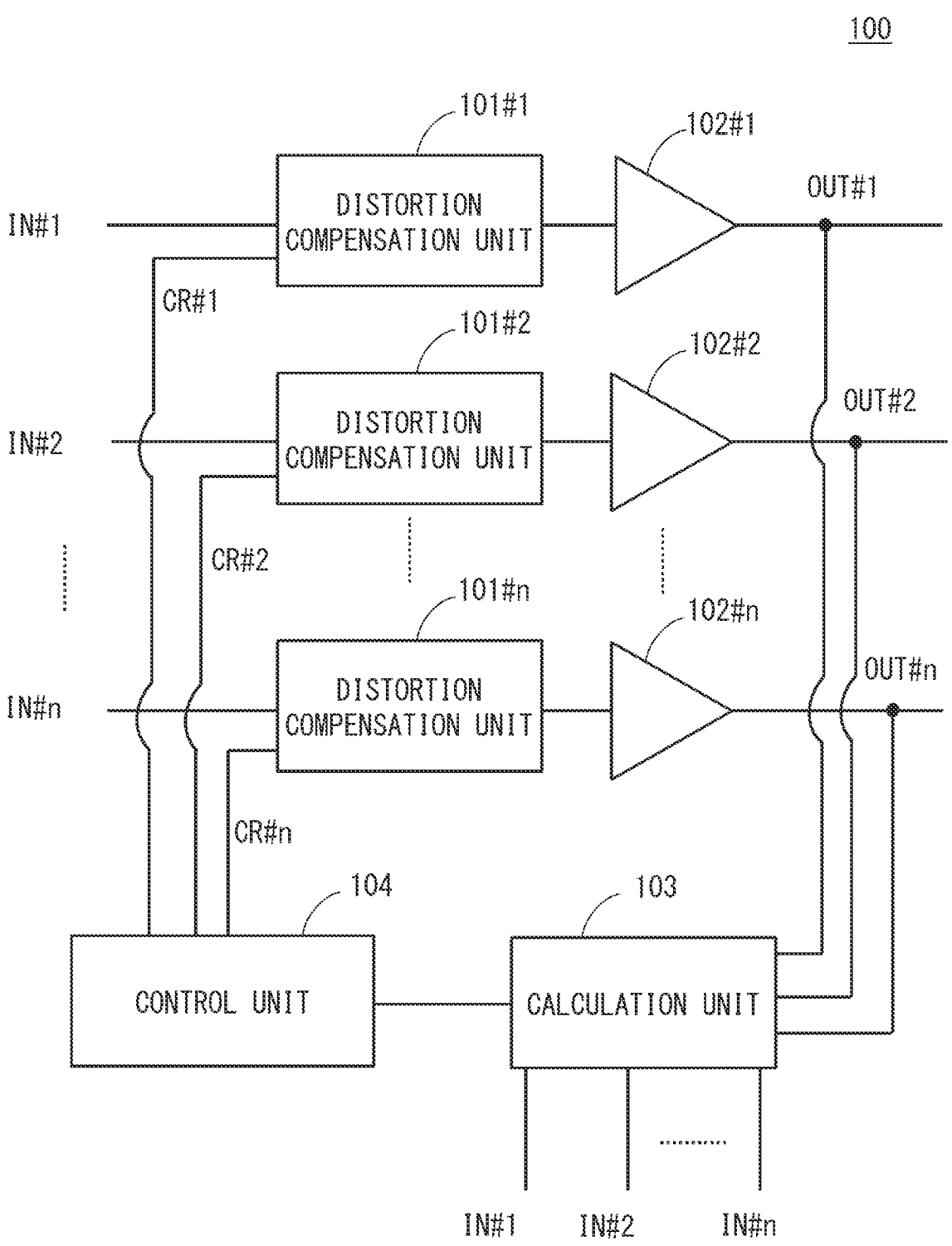
FIG. 8 is a block diagram illustrating an example of a signal processing device according to a first example embodiment.

A first example embodiment of the present disclosure is described below with reference to the drawings. FIG. 8 is a block diagram illustrating a signal processing device according to the first example embodiment. A signal processing device 100 is a device that processes an electrical signal, and can be applied to, for example, a wireless communication device of a communication system, but an application target is not limited thereto.

The signal processing device 100 includes distortion compensation units 101 #1 to 101 #n, amplifiers 102 #1 to 102 #n, a calculation unit 103, and a control unit 104. Each component will be described below. n is an arbitrary number of 2 or more, and the distortion compensation units 101 #1 to 101 #n will be collectively referred to as a distortion compensation unit 101, and the amplifiers 102 #1 to 102 #n will be collectively referred to as an amplifier 102.

The distortion compensation units 101 #1 to 101 #n execute distortion compensation processing of compensating for nonlinear distortion on input signals IN #1 to IN #n, respectively, and output signals subjected to the distortion compensation processing to the corresponding amplifiers 102 #1 to 102 #n. The distortion compensation processing suppresses the nonlinear distortion of the signal output by the amplifier 102. The distortion compensation unit 101 can switch between an ON state in which the distortion compensation processing is executed and an OFF state in which the distortion compensation processing is not executed and an input signal is output as it is as an output signal under the control of the control unit 104.

The distortion compensation unit 101 executes, for example, DPD compensation processing as the distortion compensation processing. In a case where the DPD compensation processing is executed, a DPD compensation coefficient regarding an amplitude and a phase is stored inside the distortion compensation unit 101. The DPD compensation coefficient is a weight for compensating for a nonlinear AM/PM component of the amplifier 102, and the distortion compensation unit 101 selects an appropriate DPD compensation coefficient regarding the amplitude and the phase based on a characteristic of the input signal IN. The distortion compensation unit 101 executes the DPD compensation processing on the input signal IN by using the selected DPD compensation coefficient. For example, the distortion compensation unit 101 stores a lookup table (LUT) in which the value of the amplitude or (I, Q) of the input signal IN and the DPD compensation coefficient corresponding to the value are associated with each other. The distortion compensation unit 101 determines the value of the input signal IN, selects an appropriate DPD compensation coefficient by referring to the LUT based on the value, and executes the DPD compensation processing. The distortion compensation unit 101 appropriately updates the DPD compensation coefficient related to the amplitude and the phase.

The amplifier 102 #1 is an amplifier that amplifies a signal output from the distortion compensation unit 101 #1 and outputs the amplified signal as an output signal OUT #1. Similarly, the amplifiers 102 #2 to 102 #n amplify the signals output from the distortion compensation units 101 #2 to 101 #n, respectively, and output the amplified signals as output signals OUT #2 to OUT #n. Any type of amplifier can be used as the amplifier 102.

The calculation unit 103 calculates, for each of the signal channels #1 to #n, a comparison result of at least one of the phase, the amplitude, or the intensity between the input signal IN and the output signal OUT corresponding to the input signal IN. This processing is executed at least during the calibration operation of the signal processing device 100, where the calibration signal is used as the plurality of input signals IN #1 to IN #n and they are input to the amplifiers 102 #1 to 102 #n. The calibration operation may be, for example, the DL calibration operation or the UL calibration operation in the wireless communication device described in the related art described above, but is not limited thereto. In this example, the calibration signals are signals of substantially the same level for the input signals IN #1 to IN #n.

For example, the calculation unit 103 can calculate at least one of a phase difference, an amplitude ratio, or an intensity ratio between the input signal IN and the output signal OUT corresponding to the input signal IN for each of the signal channels #1 to #n. As an example, the calculation unit 103 calculates the phase difference by subtracting the corresponding output signal from the input signal. Furthermore, the calculation unit 103 calculates the amplitude ratio by dividing the input signal by the corresponding output signal. Furthermore, the calculation unit 103 calculates the intensity ratio by dividing the square of the input signal by the square of the corresponding output signal. Among the phase difference, the amplitude ratio, and the intensity ratio, it is considered that the phase difference is most sensitive to degradation of the DL SINR at the time of data beamforming in determination by the control unit 104 to be described below, but the amplitude ratio and the intensity ratio can also be used as determination factors. Such a comparison result is calculated to determine whether or not the memory effect occurs in the distortion compensation units 101 #1 to 101 #n.

The control unit 104 controls whether or not the distortion compensation unit 101 executes the distortion compensation processing by controlling on/off of the distortion compensation units 101 #1 to 101 #n during the calibration operation based on the comparison result calculated by the calculation unit 103.

As described above, the calibration signal is a signal having substantially the same level for the input signals IN #1 to IN #n. On the other hand, the input/output levels of the input signals #1 to #n obtained when going back to the past from the calibration signal period are different from each other. Furthermore, in a case where there is a memory effect in the nonlinearity of the amplifier, different AM-AM and AM-PM characteristics are maintained for each signal channel. As a result, the calibration signals pass through the amplifiers 102 having different AM-AM and AM-PM characteristics in the subsequent calibration period, and thus, a difference occurs in the frequency characteristic of the amplitude or the phase between the signal channels. For example, in a case where each amplifier is connected to the transmitter, a difference occurs in the frequency characteristic of the amplitude or the phase between the transmitters.

Therefore, it is possible to determine whether or not the memory effect of the amplifier 102 is at a significant level by comparing the phase differences and the like in the signal channels #1 to #n in a case where the calibration signals are output to the amplifiers 102 #1 to 102 #n. In a case where there is a significant memory effect, since the influence of the previous input signal is large, a difference based on the comparison result has a large value. On the other hand, in a case where there is no significant memory effect, since the influence of the previous input signal is 0 or small, the difference based on the comparison result is 0 or a small value.

Figure 9A:
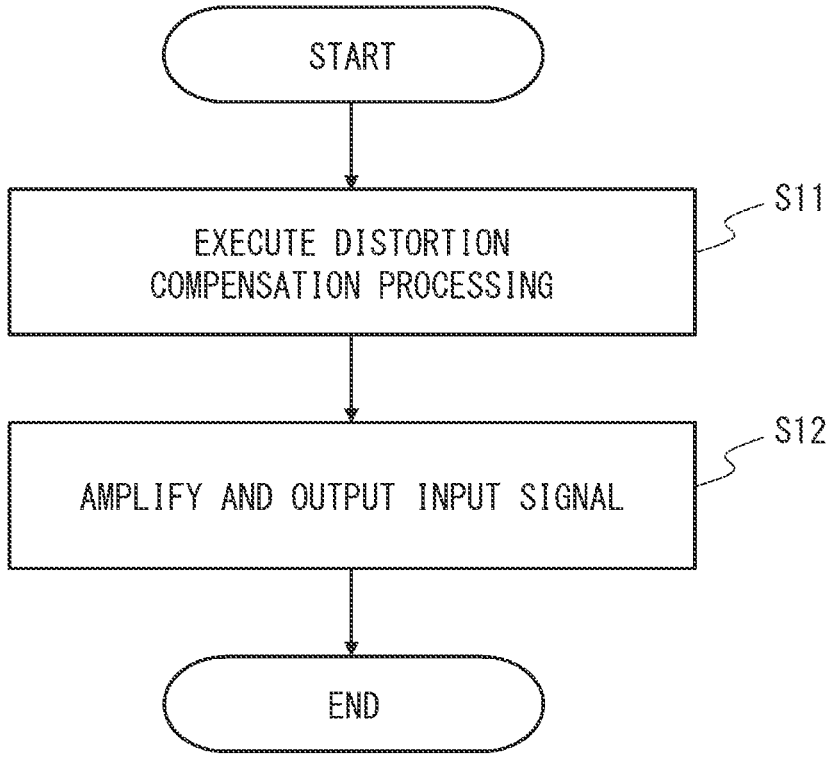
FIG. 9A is a flowchart illustrating an example of processing in the signal processing device according to the first example embodiment.

FIG. 9A is a flowchart illustrating processing executed by the signal processing device 100 in a case where a normal input signal that is not a calibration signal is input to each amplifier 102. First, the distortion compensation units 101 #1 to 101 #n execute the distortion compensation processing on the plurality of input signals IN #1 to IN #n, and output signals subjected to the distortion compensation processing to the corresponding amplifiers 102 (step S11). The amplifiers 102 #1 to 102 #n amplify the signals output from distortion compensation units 101 #1 to 101 #n, respectively, and output the amplified signals as the output signals OUT #1 to OUT #n (step S12).

The above-described normal input signal is, for example, a signal (communication signal) related to wireless transmission or reception in the wireless communication device. In this case, as the distortion compensation processing is executed in this manner, a SINR of the communication signal can be improved.

Figure 9B:
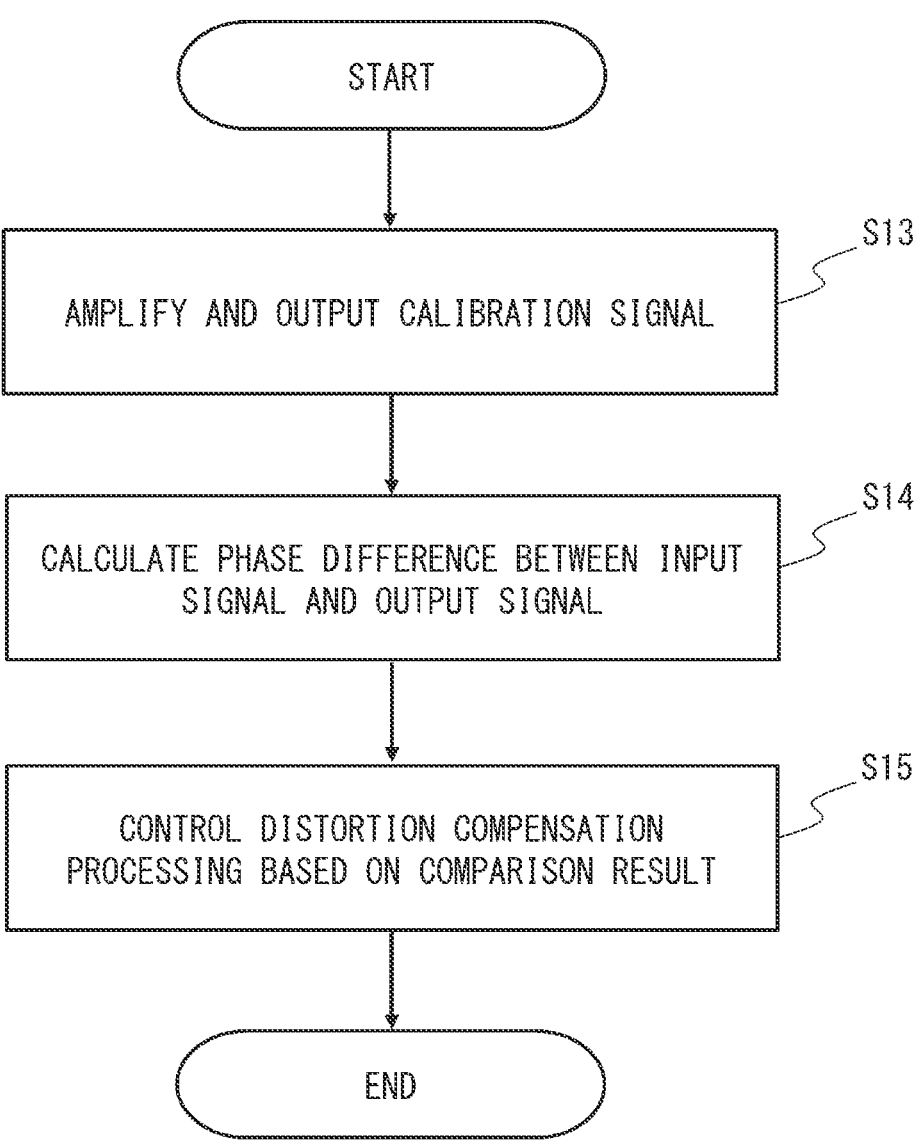
FIG. 9B is a flowchart illustrating an example of processing in the signal processing device according to the first example embodiment.

FIG. 9B is a flowchart illustrating processing executed by the signal processing device 100 in a case where the calibration signals are input to the respective amplifiers 102 as the input signals IN #1 to IN #n. Since the signal processing device 100 is in a state of not executing normal processing based on a normal input signal, the distortion compensation units 101 #1 to 101 #n are turned off in the initial state of the flow illustrated in FIG. 9B.

First, the calibration signals are input as the input signals IN #1 to IN #n to the amplifiers 102 #1 to 102 #n. Each of the amplifiers 102 #1 to 102 #n amplifies and outputs the calibration signal (step S13).

In this example, the calculation unit 103 calculates the phase differences between the input signals IN #1 to IN #n and the output signals OUT #1 to OUT #n respectively corresponding to the input signals IN #1 to IN #n (step S14). However, as described above, the calculation unit 103 may calculate a result of comparison of other types of phases, amplitudes, and intensities. The control unit 104 controls whether or not to execute the distortion compensation processing on the calibration signal of each signal channel by controlling on/off of the distortion compensation units 101 #1 to 101 #n based on the phase difference comparison result calculated by the calculation unit 103 (step S15).

As described above, the control unit 104 of the signal processing device 100 controls whether or not to cause the distortion compensation unit 101 to execute the distortion compensation processing based on the comparison result calculated by the calculation unit 103. Therefore, the control unit 104 can accurately determine that the memory effect remains in the amplifier 102 and cause the distortion compensation unit 101 to execute the distortion compensation processing. Therefore, the signal processing device 100 can learn the difference in frequency characteristic of the amplitude or the phase between the signal channels by using the calibration signal. As a result, the difference in frequency characteristic is corrected, so that accurate calibration can be performed.

Specifically, in a case where the calculation unit 103 calculates the phase difference for each of the input signal IN #1–the output signal OUT #1, the input signal IN #2–the output signal OUT #2, . . . , and the input signal IN #n–the output signal OUT #n, the control unit 104 may determine whether or not a predetermined condition that there is a difference between the phase differences is satisfied, the difference being equal to or greater than a preset first threshold. Furthermore, in a case where the calculation unit 103 calculates the amplitude ratio, the control unit 104 may determine whether or not a predetermined condition that there is a difference between the amplitude ratios is satisfied, the difference being equal to or greater than a preset second threshold. Furthermore, in a case where the calculation unit 103 calculates the intensity ratio, the control unit 104 may determine whether or not a predetermined condition that there is a difference between the intensity ratios is satisfied, the difference being equal to or greater than a preset third threshold.

In addition, the calculation unit 103 may calculate two or more of n phase differences, n amplitude ratios, and n intensity ratios. For example, in a case where the calculation unit 103 calculates the phase difference and the amplitude ratio, the control unit 104 may determine whether or not a predetermined condition that at least one of the difference between the phase differences that is equal to or greater than the first threshold or the difference between the amplitude ratios that is equal to or greater than the second threshold exists is satisfied. Even in a case where the calculation unit 103 calculates the phase difference and the intensity ratio, a case where the calculation unit 103 calculates the amplitude ratio and the intensity ratio, or a case where the calculation unit 103 calculates the phase difference, the amplitude ratio, and the intensity ratio, similar determination can be performed. That is, the control unit 104 determines whether or not at least one of the difference between the phase differences, the difference between the amplitude ratios, or the difference between the intensity ratios is equal to or greater than a predetermined threshold.

In a case where the above-described predetermined condition is satisfied, the control unit 104 performs control to turn on the distortion compensation units 101 #1 to 101 #n and execute the distortion compensation processing for the calibration signal. As a result, even if the memory effect of the nonlinear characteristic based on the past input signal occurs in the amplifier 102, the control unit 104 controls in such a way that a variation in amplitude or phase caused by the memory effect is treated as a correction target and the input signal is not overcompensated, for the calibration signal. Specifically, the control unit 104 corrects the non-linearity of the amplifier 102 in a short period of time in the distortion compensation unit 101 at the time of learning the frequency characteristic in the calibration signal. As a result, the control unit 104 can accurately determine an amplitude or phase error between the signal channels, correct the error, and make the output signal of the amplifier 102 uniform.

Furthermore, in a case where the above-described predetermined condition is not satisfied, the control unit 104 can also perform control to turn off the distortion compensation units 101 #1 to 101 #n and not to execute the distortion compensation processing. As a result, in a case where it is determined that there is no significant memory effect, it is possible to suppress an extra signal change based on the distortion compensation processing from being executed on the CAL signal. As a result, it is possible to prevent the calibration from becoming inaccurate.

In the above-described processing, the control unit 104 may specify the maximum phase difference and the minimum phase difference among the calculated n phase differences, calculate a difference between the two phase differences, and determine whether or not the difference is equal to or greater than the first threshold. As described above, since the control unit 104 uses the maximum value and the minimum value of the calculated values for comparison, the control unit 104 does not need to execute comparison processing on all the values, and thus can execute comparison processing faster. This processing can be similarly executed for the amplitude ratio and the intensity ratio.

The calibration signals do not have to be completely identical in phase or amplitude for each of the signal channels #1 to #n. In this case, the threshold used for the determination by the control unit 104 is set to a value with which the memory effect of the amplifier 102 can be reliably detected in consideration of the difference in original phase or amplitude of the calibration signal in each signal channel.

In the above description, the distortion compensation unit 101 is provided for each of the signal channels #1 to #n. However, there may be a signal channel for which the amplifier 102 is provided but the distortion compensation unit 101 is not provided. Furthermore, the distortion compensation unit 101 of one unit may execute the distortion compensation processing on the plurality of signal channels and output signals subjected to the distortion compensation processing to the plurality of amplifiers 102. Even with such a circuit configuration, it is possible to configure a circuit for wireless communication by connecting a transmitter for wireless communication downstream of each amplifier 102.

Further, the distortion compensation unit 101 may perform distortion compensation by another method instead of DPD compensation. For example, distortion compensation (OpenLoop compensation) in a feedforward method may be performed. In addition, a technology of artificial intelligence (AI) and deep learning may be applied to the distortion compensation unit 101 to cause the distortion compensation unit to learn and store a compensation result for a large amount of nonlinear distortion, thereby determining the maximum likelihood compensation coefficient used for distortion compensation.

Second Example Embodiment

A second example embodiment of the present disclosure is described below with reference to the drawings. In the second example embodiment, the signal processing described in the first example embodiment will be described with a detailed specific example.

Figure 10:
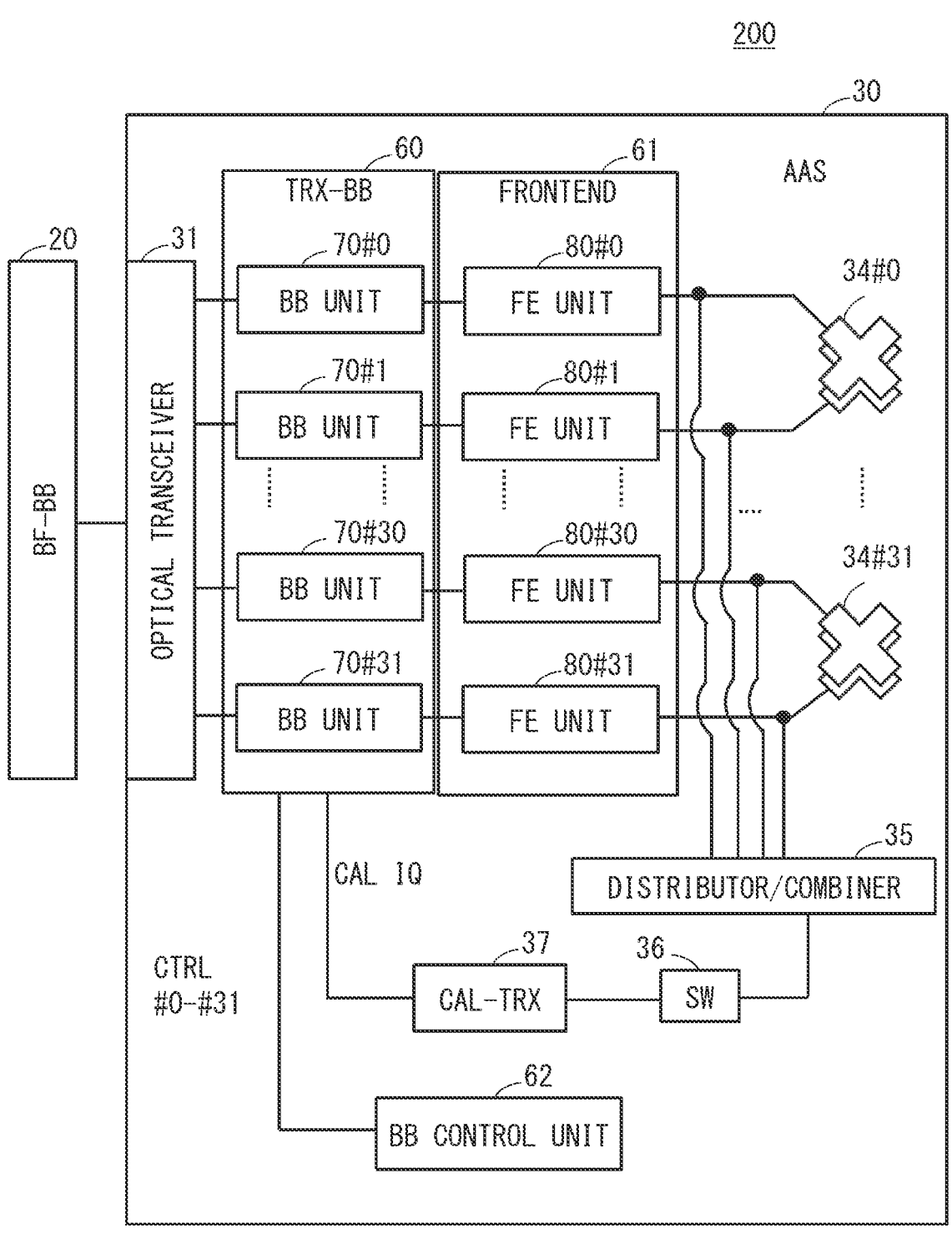
FIG. 10 is a block diagram illustrating an example of a wireless communication device according to a second example embodiment.

FIG. 10 is a block diagram illustrating a configuration of a wireless communication device 200 according to the second example embodiment. The wireless communication device 200 is a specific application example of the signal processing device 100. The wireless communication device 200 is obtained by modifying a part of the wireless communication device 10 according to the above-described related art. Portions denoted by the same reference numerals as those of the wireless communication device 10 have the same configurations as those of the corresponding portions in the wireless communication device 10, and the same processing is executed, and thus, a description thereof will be appropriately omitted.

The wireless communication device 200 includes a BF-BB unit 20 and an AAS unit 30. Here, the AAS unit 30 includes an optical transceiver 31, a TRX-BB unit 60, a frontend unit 61, 32 antennas 34, a distributor/combiner 35, a SW 36, a CAL-TRX 37, and a BB control unit 62.

The TRX-BB unit 60 functions as a transceiver baseband unit and includes 32 BB units 70 #0 to 70 #31. Hereinafter, the BB units 70 #0 to 70 #31 will be collectively referred to as a BB unit 70.

Figure 11:
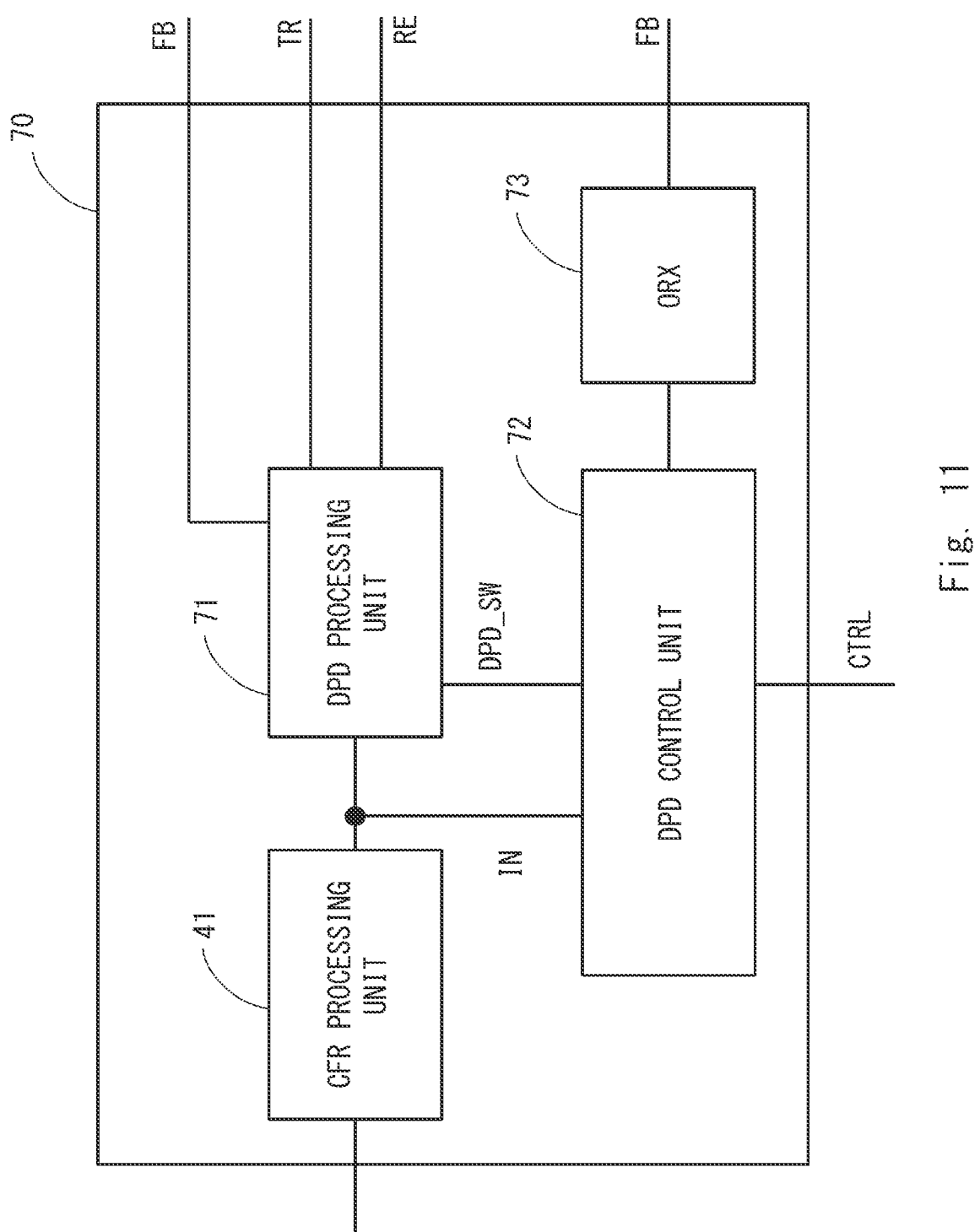
FIG. 11 is a block diagram illustrating an example of a BB unit according to the second example embodiment.

FIG. 11 is a block diagram of the BB unit 70. The BB unit 40 includes a CFR processing unit 41, a DPD processing unit 71, a DPD control unit 72, and an ORX 73. Note that each of the BB units 70 #0 to 70 #31 has the same configuration as that illustrated in FIG. 2.

The DPD processing unit 71 is a unit corresponding to the distortion compensation unit 101 described in the first example embodiment, and executes the following processing in addition to the processing executed by the DPD processing unit 42 according to the related art. The DPD processing unit 71 can switch between an ON state in which the DPD compensation processing is executed and an OFF state in which the DPD compensation processing is not executed and an input signal is output as it is by a control signal DPD_SW output by the DPD control unit 72. In addition, a DPD compensation coefficient is stored inside the DPD processing unit 71, and the DPD processing unit 71 selects an appropriate DPD compensation coefficient based on the characteristic of the input signal and executes the DPD compensation processing on the input signal. The DPD compensation coefficient is a weight for compensating for a nonlinear AM/PM component of a transmission amplifier 52, and the DPD processing unit 71 selects an appropriate DPD compensation coefficient related to the amplitude and the phase based on a characteristic of an input signal IN and executes the DPD compensation processing on the input signal IN. Details of the DPD compensation coefficient are as described in the first example embodiment.

The DPD control unit 72 is a unit corresponding to the calculation unit 103 described in the first example embodiment, and the input signal IN output from the CFR processing unit 41 and an output signal FB are input to the DPD control unit 72. The output signal FB is a signal obtained by feeding back an output signal output from the transmission amplifier 52 on the same channel as the BB unit 70. The DPD control unit 72 calculates a phase difference and an amplitude ratio between the input signal IN and the output signal FB. The DPD control unit 72 outputs data of the calculated phase difference and amplitude ratio to the BB control unit 62.

In addition, the DPD control unit 72 receives a control signal CTRL from the BB control unit 62, and outputs the control signal DPD_SW for switching on/off of the DPD processing unit 71 based on the control signal CTRL.

The ORX 73 is a receiver, and transfers an output signal FB output from a directional coupler 53 described below to the DPD control unit 72.

Figure 12:
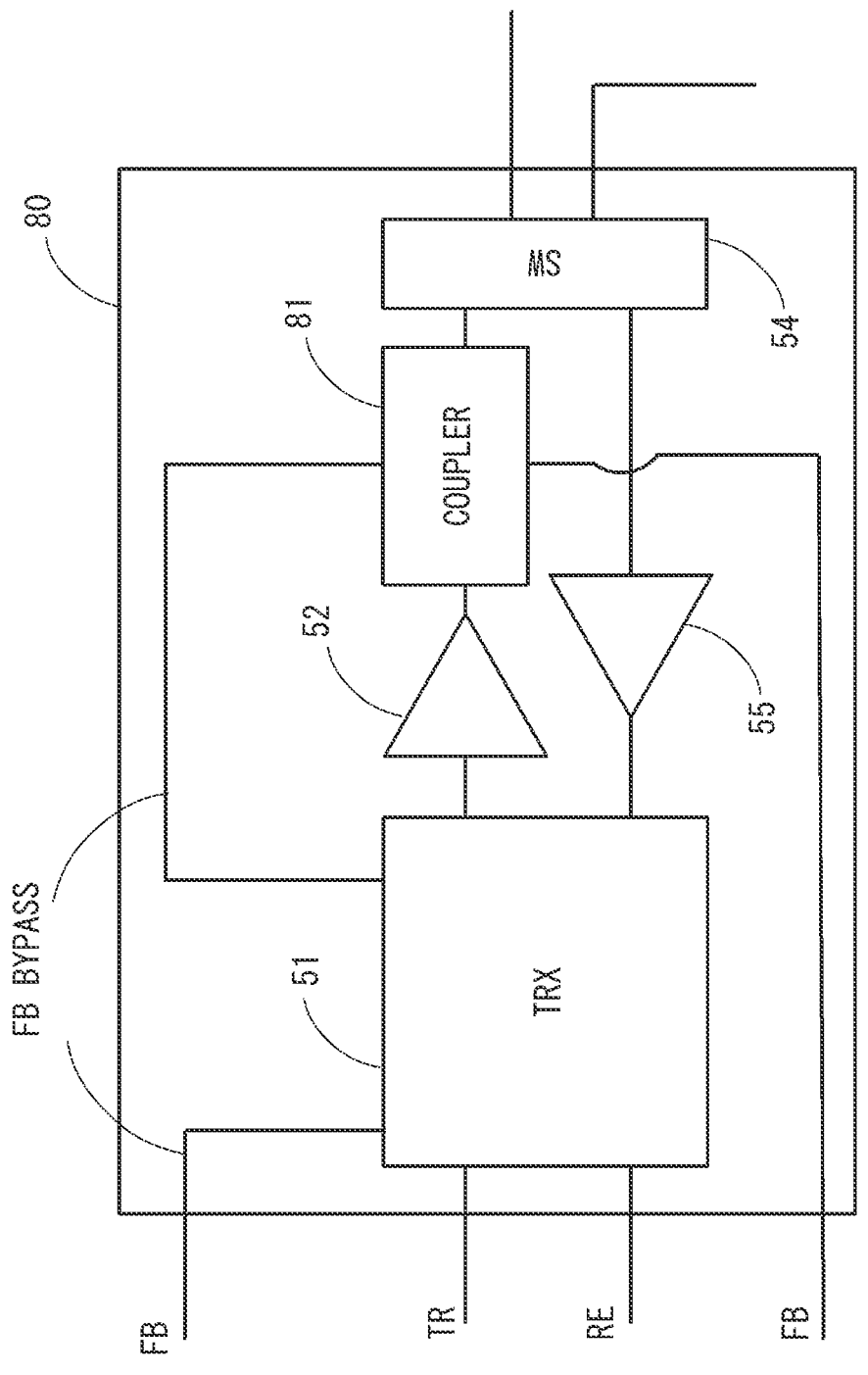
FIG. 12 is a block diagram illustrating an example of an FE unit according to the second example embodiment.

FIG. 12 is a block diagram of the FE unit 80. The FE unit 50 includes a TRX 51, the transmission amplifier 52, the directional coupler 81, a SW 54, and a reception amplifier 55. Each of the FE units 80 #0 to 80 #31 has the same configuration as that illustrated in FIG. 3.

The directional coupler 81 has the following function in addition to the function of the directional coupler 53 according to the related art. The directional coupler 81 outputs, as the output signal FB, an RF signal output from the transmission amplifier 52 to the DPD control unit 72 via the ORX 73.

Returning to FIG. 10, the BB control unit 62 will be described. The BB control unit 62 is a unit corresponding to the control unit 104 described in the first example embodiment, and receives the data of the phase difference and the amplitude ratio output from the DPD control unit 72 of each signal channel. Then, the BB control unit 62 specifies the maximum phase difference and the minimum phase difference among the calculated 32 phase differences, calculates a difference between the two phase differences, and determines whether or not the difference is equal to or greater than a first threshold. Furthermore, the BB control unit 62 specifies the maximum amplitude ratio and the minimum amplitude ratio among the calculated 32 amplitude ratios, calculates a difference between the two amplitude ratios, and determines whether or not the difference is equal to or greater than a second threshold.

In a case where the difference between the maximum phase difference and the minimum phase difference is equal to or greater than the first threshold or the difference between the maximum amplitude ratio and the minimum amplitude ratio is equal to or greater than the second threshold, the BB control unit 62 outputs control signals CTRL #0 to CTRL #31 for turning on the DPD processing units 71 to the respective DPD control units 72. On the other hand, in a case where the difference between the maximum phase difference and the minimum phase difference is less than the first threshold and the difference between the maximum amplitude ratio and the minimum amplitude ratio is less than the second threshold, the control signals CTRL #0 to CTRL #31 are not output. Therefore, each DPD processing unit 71 is not turned on and remains off.

Figure 13A:
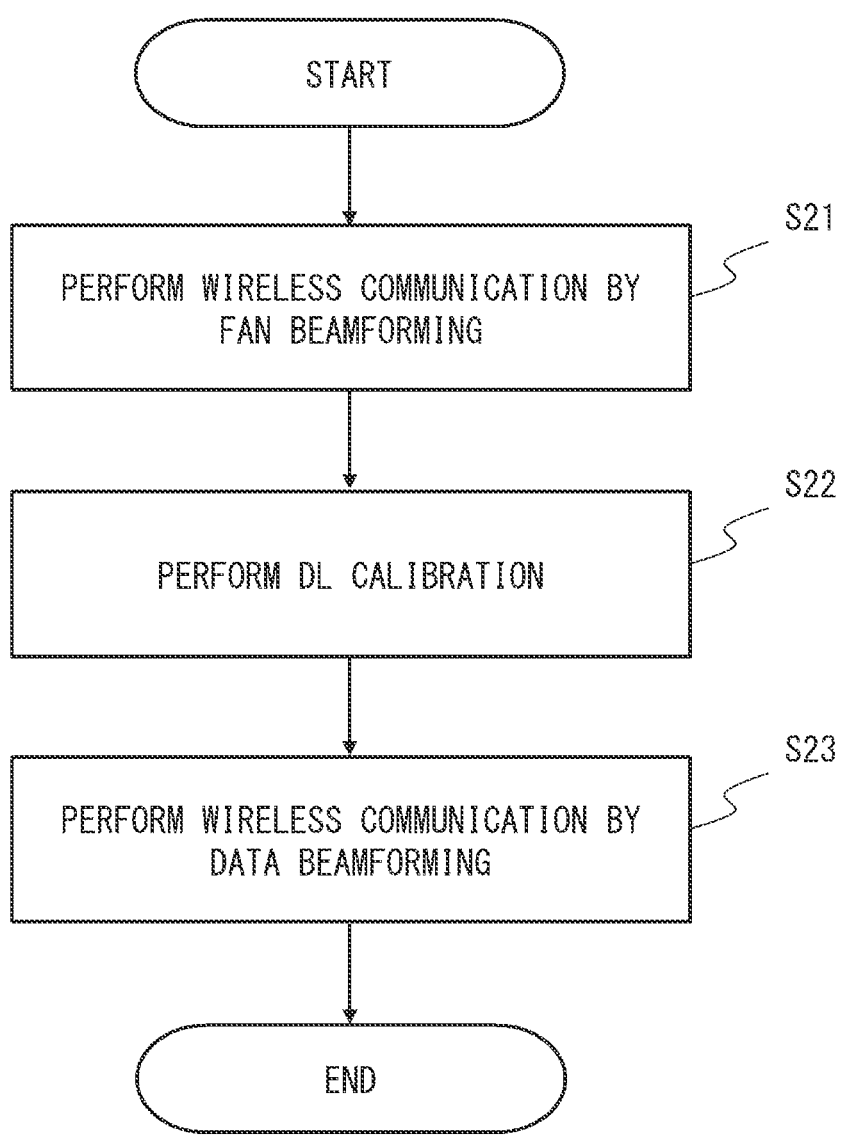
FIG. 13A is a flowchart illustrating an example of processing in the wireless communication device according to the second example embodiment.

FIG. 13A is a flowchart illustrating signal processing executed by the wireless communication device 200. Hereinafter, signal processing to be performed will be described.

First, the wireless communication device 200 transmits a wireless signal by fan beamforming (step S21). Specifically, as described in the related art, the BF-BB unit 20 generates a BF signal by using a DL-CAL weight previously generated and stored in the BF-BB unit 20, and outputs the BF signal to the AAS unit 30.

Next, the wireless communication device 200 performs DL calibration (step S22). Details of this processing will be described below. In step S22, the BF-BB unit 20 can update the DL-CAL weight.

Then, the wireless communication device 200 transmits a wireless signal by data beamforming (step S23). By the DL calibration set in step S22, the wireless communication device 200 can perform wireless communication by data beamforming in which a null point is set with high accuracy. In steps S21 and S23, each DPD processing unit 71 is set to the ON state under the control of the BB control unit 62. Other details of the signal processing in steps S21 and S23 are as described in the related art.

Figure 13B:
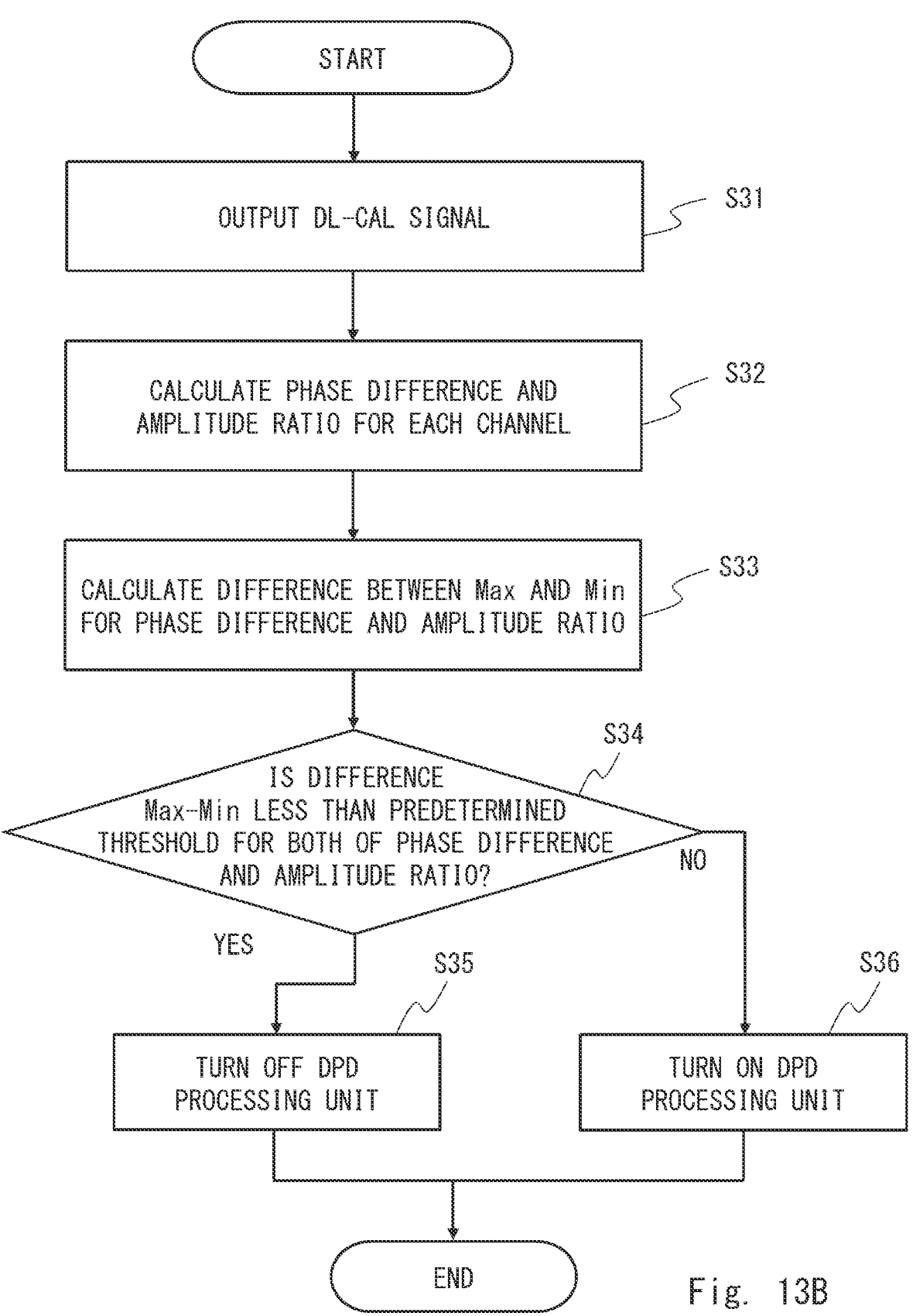
FIG. 13B is a flowchart illustrating an example of detailed processing in the wireless communication device according to the second example embodiment.

FIG. 13B is a flowchart illustrating details of the signal processing executed in step S22. Details of the processing will be described below.

First, the TRX-BB unit 60 outputs a DL-CAL signal to the frontend unit 61 (step S31). The DL-CAL signal is amplified and output by the transmission amplifier 52 of the FE unit 80 of each transmitter. The directional coupler 81 outputs the output signal FB of the transmission amplifier 52 to the DPD control unit 72 via the ORX 73. At this stage, each DPD processing unit 71 is set to an OFF state.

The DPD control unit 72 of each transmitter calculates a phase difference and an amplitude ratio between the output signal FB and the input signal IN which is the DL-CAL signal output from the CFR processing unit 41 (step S32). The DPD control unit 72 outputs data of the calculated phase difference and amplitude ratio to the BB control unit 62.

The BB control unit 62 specifies the maximum phase difference and the minimum phase difference among the calculated phase differences of the respective transmitters (32 transmitters) and calculates a difference between the two phase differences. Furthermore, the BB control unit 62 specifies the maximum amplitude ratio and the minimum amplitude ratio among the calculated amplitude ratios of the respective transmitters and calculates a difference between the two amplitude ratios (step S33).

The BB control unit 62 determines whether or not the difference between the maximum phase difference and the minimum phase difference is less than the first threshold and the difference between the maximum amplitude ratio and the minimum amplitude ratio is less than the second threshold (step S34).

As described in the related art, the wireless signal by fan beamforming is a signal having different amplitude and phase in each transmitter. When the wireless communication device 200 outputs the wireless signal, a difference occurs in AM-AM and AM-PM characteristics due to a nonlinear memory effect in the transmission amplifiers of the transmitters. Meanwhile, for the DL-CAL signal, it is important to prevent overcompensation or insufficient compensation from occurring in the DL-CAL signal due to the difference caused in the AM-AM and AM-PM characteristics. Therefore, if there is no significant memory effect in the transmission amplifier 52, even after the wireless signal by fan beamforming is output, the AM-AM and AM-PM characteristics between the transmitters are uniquely determined depending on the DL-CAL signal level of the same level. Therefore, the influence on the DL-CAL signal is reduced. On the other hand, in a case where there is a significant memory effect, the influence of the signal by the previous fan beamforming is reflected, and the difference between the phase differences has a large value. In step S34, the BB control unit 62 determines the presence or absence of such a significant memory effect.

In a case where the difference between the maximum phase difference and the minimum phase difference is less than the first threshold and the difference between the maximum amplitude ratio and the minimum amplitude ratio is less than the second threshold (Yes in step S34), the BB control unit 62 controls not to output the control signals CTRL #0 to CTRL #31 and to keep each DPD processing unit 71 off (step S35).

On the other hand, in at least one of a case where the difference between the maximum phase difference and the minimum phase difference is equal to or greater than the first threshold or a case where the difference between the maximum amplitude ratio and the minimum amplitude ratio is equal to or greater than the second threshold (No in step S34), the BB control unit 62 executes the following processing. The BB control unit 62 outputs the control signals CTRL #0 to CTRL #31 for turning on the DPD processing units 71 to each DPD control unit 72 (step S36).

After setting on or off of the DPD processing unit 71 as described above, the wireless communication device 200 sets the DL-CAL weight by the DL calibration operation described in the related art. At this time, even in a case where a significant memory effect occurs in the transmission amplifier 52, the DPD processing unit 71 compensates for the memory effect, so that the null point in the next wireless communication by data beamforming can be accurately set.

In a case where a significant memory effect does not occur in the transmission amplifier 52, it is considered that the accuracy of the null point in the next wireless communication by data beamforming is sufficiently secured even in a case where the CAL weight is set in a state where the DPD compensation processing is not executed in the DL calibration operation. In addition, in general, an update cycle of the DPD compensation coefficient in the DPD processing unit 71 is not synchronized with or is not the same as an update cycle of the DL-CAL. Therefore, in a case where the DPD processing unit 71 is turned on, the DL-CAL signal is subjected to DPD compensation with the DPD compensation coefficient determined at the time of transmitting the wireless signal by fan beamforming, so that the amplitude and phase of the output DL-CAL signal may change. As a result, the CAL weight calculated when the DPD compensation is turned on may degrade the accuracy of the null point to be determined more than the CAL weight calculated when the DPD processing unit 71 is turned off. Therefore, in this case, the wireless communication device 200 turns off the DPD processing unit 71. As described above, in the second example embodiment, by switching on and off of the DPD compensation processing at the time of the calibration operation, it is possible to autonomously achieve both the DPD compensation processing for compensating for non-linearity of the amplifier and the calibration operation for determining the MU-MIMO performance (MIMO spatial multiplexing performance).

In the wireless communication device 10, the calibration operation is performed after a signal for wireless transmission by fan beamforming is output, and then a signal for wireless transmission by beamforming is output. Therefore, the wireless communication device 10 can improve the quality of a signal in beamforming.

Various types of transmission amplifiers 52 can be applied, and for example, a Doherty amplifier may be applied. The Doherty amplifier is an amplifier for high frequency, and as an example, a gallium nitride (GaN) Doherty amplifier is used because it can output a large power and can achieve high efficiency and low power consumption. Such a GaN Doherty amplifier is effective in reducing power consumption, but as described above, the memory effect may occur in the AM-AM input/output characteristics and the AM-PM input/output characteristics. However, in the second example embodiment, the inconvenience caused by the memory effect can be eliminated.

In addition, in the wireless communication device 200 that performs wireless communication, both the DPD compensation processing and the calibration operation can be achieved, so that the quality of wireless communication can be further improved.

Note that the present disclosure is not limited to the above example embodiments, and can be appropriately changed without departing from the gist. For example, the number of transmitters in the second example embodiment is not limited to 32. Instead of the wireless signal of the fan beam in the second example embodiment, another wireless signal of wide-angle radiation (for example, intended for omnidirectional wireless signal radiation) may be used.

The wireless communication method to which the technology of the present disclosure can be applied is not limited to those described in the related art and the second example embodiment.

In the example embodiments described above, the disclosure has been described as a hardware configuration, but the disclosure is not limited thereto. The processing (steps) in the device described in the above-described example embodiments of the disclosure can also be implemented by causing a processor in a computer to execute a computer program.

Figure 14:
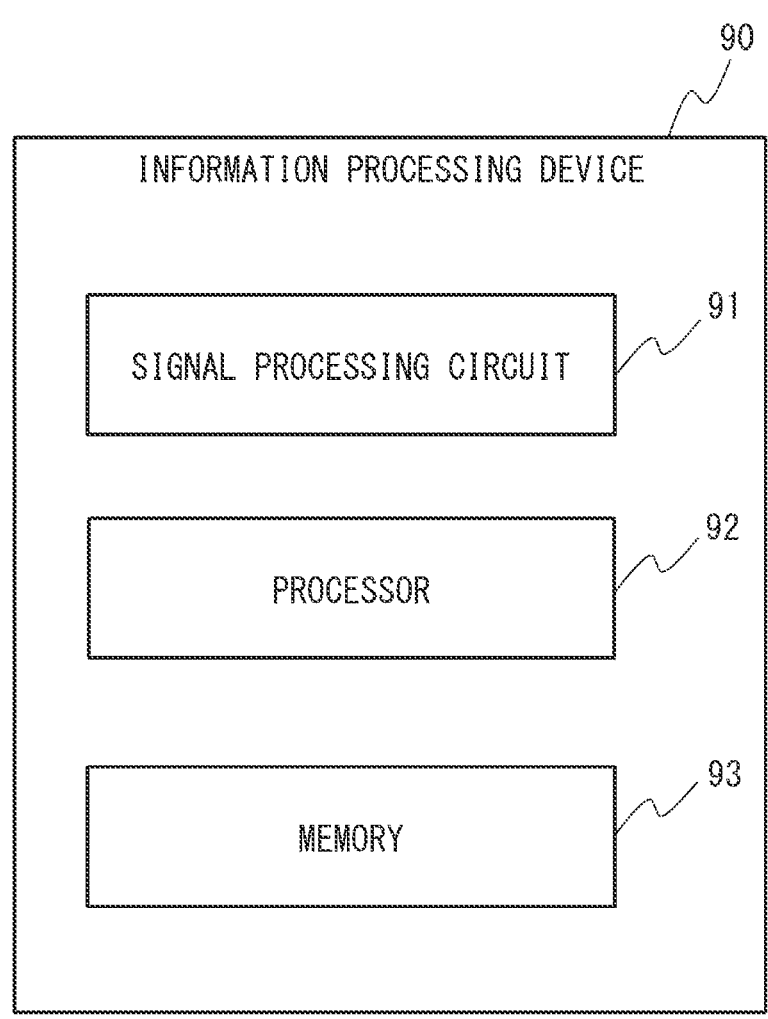
FIG. 14 is a block diagram illustrating an example of a hardware configuration of the device according to each example embodiment.

FIG. 14 is a block diagram illustrating a hardware configuration example of an information processing device (signal processing device) in which the processing of each example embodiment described above is executed. Referring to FIG. 14, an information processing device 90 includes a signal processing circuit 91, a processor 92, and a memory 93.

The signal processing circuit 91 is a circuit for processing a signal under the control of the processor 92. The signal processing circuit 91 may include a communication circuit that receives a signal from a transmission device.

The processor 92 reads and executes software (computer program) from the memory 93 to execute the processing in the device described in the above-described example embodiments. As an example of the processor 92, one of a central processing unit (CPU), a micro processing unit (MPU), a field-programmable gate array (FPGA), a demand-side platform (DSP), or an application specific integrated circuit (ASIC) may be used, or more than one of these may be used in parallel.

The memory 93 is implemented by a combination of a volatile memory and a nonvolatile memory. The memory 93 may include a storage disposed away from the processor 92. In this case, the processor 92 may access the memory 93 through an input/output (I/O) interface (not illustrated).

In the example of FIG. 14, the memory 93 is used to store a software module group. The processor 92 can execute the processing described in the above-described example embodiments by reading and executing these software module groups from the memory 93.

As described above, one or a plurality of processors included in each device in the above-described example embodiments executes one or a plurality of programs including a command group for causing a computer to perform the algorithm described with reference to the drawings. With this processing, the signal processing method described in each example embodiment can be implemented.

The program can be stored using various types of non-transitory computer readable media to be supplied to a computer. The non-transitory computer readable media include various types of tangible storage media. Examples of the non-transitory computer readable medium include a magnetic recording medium (for example, a flexible disk, a magnetic tape, or a hard disk drive), an optical magnetic recording medium (for example, a magneto-optical disk), a CD-ROM (read only memory), a CD-R, a CD-R/W, and a semiconductor memory such as a mask ROM, a programmable ROM (PROM), an erasable PROM (EPROM), a flash ROM, or a random access memory (RAM). In addition, the program may be supplied to the computer by various types of transitory computer readable media. Examples of the transitory computer readable media include electric signals, optical signals, and electromagnetic waves. The transitory computer readable medium can supply the program to the computer via a wired communication path such as an electric wire and an optical fiber, or a wireless communication path.

Although the present disclosure has been described above with reference to the example embodiments, the present disclosure is not limited to the above. Various modifications that could be understood by those skilled in the art can be made to the configuration and details of the present disclosure within the scope of the disclosure.

This application claims priority based on Japanese Patent Application No. 2020-217114 filed on Dec. 25, 2020, the disclosure of which is incorporated herein in its entirety.

REFERENCE SIGNS LIST

10 WIRELESS COMMUNICATION DEVICE
20 BF-BB UNIT
30 AAS UNIT
31 OPTICAL TRANSCEIVER
32 TRX-BB UNIT
33 FRONTEND UNIT
34 ANTENNA

35 DISTRIBUTOR/COMBINER
37 CAL-TRX
40 BB UNIT
41 CFR PROCESSING UNIT
42 DPD PROCESSING UNIT
50 FE UNIT
51 TRX
52 TRANSMISSION AMPLIFIER
53 DIRECTIONAL COUPLER
54 SW
55 RECEPTION AMPLIFIER
60 TRX-BB UNIT
61 FRONTEND UNIT
62 BB CONTROL UNIT
70 BB UNIT
71 DPD PROCESSING UNIT
72 DPD CONTROL UNIT
73 ORX
80 FE UNIT
81 DIRECTIONAL COUPLER
100 SIGNAL PROCESSING DEVICE
101 DISTORTION COMPENSATION UNIT
102 AMPLIFIER
103 CALCULATION UNIT
104 CONTROL UNIT
200 WIRELESS COMMUNICATION DEVICE

What is claimed is:

1. A signal processing device comprising:
a distortion compensation circuit configured to execute distortion compensation processing of compensating for nonlinear distortion on one or more input signals among a plurality of input signals, and output a signal subjected to the distortion compensation processing;
a plurality of amplifiers configured to amplify the plurality of input signals including the signal output from the distortion compensation circuit and output the amplified signals as output signals;
a calculation circuit configured to calculate, for each input signal of the plurality of input signals, at least one of a phase difference, an amplitude ratio, or an intensity ratio between the input signal and the output signal corresponding to the input signal during a calibration operation of the signal processing device in which calibration signals are used as the plurality of input signals and are input to the plurality of amplifiers; and
a controller configured to specify a maximum value and a minimum value for numerical values of any of the phase difference, the amplitude ratio, or the intensity ratio calculated by the calculation circuit, determine whether or not a first difference is equal to or greater than a first threshold, and control whether or not the distortion compensation circuit executes the distortion compensation processing on the calibration signals based on the determination result, wherein the first difference is a difference between the maximum value and the minimum value.

2. The signal processing device according to claim 1, wherein signals for wireless transmission of wide-angle radiation are input to the plurality of amplifiers as the plurality of input signals before the calibration operation, and signals for wireless transmission by data beamforming are input to the plurality of amplifiers as the plurality of input signals after the calibration operation.

3. The signal processing device according to claim 1, wherein the plurality of amplifiers are Doherty amplifiers.

4. The signal processing device according to claim 1, wherein the signal processing device is a wireless communication device further comprising wireless transmitter for wirelessly transmitting the output signals from the plurality of amplifiers.

5. The signal processing device according to claim 1, wherein the calculation circuit calculates, for each input signal of the plurality of input signals, the phase difference and the amplitude ratio between the input signal and the output signal corresponding to the input signal; and wherein the controller is configured to perform:

determining whether a second difference, which is a difference between a maximum value and a minimum value of the phase difference, is equal to or greater than a second threshold value, and determining whether a third difference, which is a difference between a maximum value and a minimum value of the amplitude ratio, is equal to or greater than a third threshold value; and controlling the distortion compensation circuit to execute the distortion compensation processing on the calibration signals in a case where the second difference is equal to or greater than the second threshold value or the third difference is equal to or greater than the third threshold value, and controls the distortion compensation circuit not to execute the distortion compensation processing on the calibration signals in a case where the second difference is less than the second threshold value and the third difference is less than the third threshold value.

6. A signal processing method performed by a signal processing device comprising:

executing distortion compensation processing of compensating for nonlinear distortion on one or more input signals among a plurality of input signals, and outputting a signal subjected to the distortion compensation processing;

amplifying, by a plurality of amplifiers, the plurality of input signals including the signal subjected to the distortion compensation processing and outputting the amplified signals as output signals;

calculating, for each input signal of the plurality of input signals, at least one of a phase difference, an amplitude ratio, or an intensity ratio between the input signal and the output signal corresponding to the input signal during a calibration operation of the signal processing device in which calibration signals are used as the plurality of input signals and are input to the plurality of amplifiers; and specifying a maximum value and a minimum value for numerical values of any of the phase difference, the amplitude ratio, or the intensity ratio, determine whether or not a first difference is equal to or greater than a first threshold, and controlling whether or not to execute the distortion compensation processing on the calibration signals based on the determination result, wherein the first difference is a difference between the maximum value and the minimum value.

7. A non-transitory computer readable medium storing a program for causing a-signal processing device to perform:

executing distortion compensation processing of compensating for nonlinear distortion on one or more input signals among a plurality of input signals, and outputting a signal subjected to the distortion compensation processing;

amplifying, by a plurality of amplifiers, the plurality of input signals including the signal subjected to the distortion compensation processing and outputting the amplified signals as output signals;

calculating, for each input signal of the plurality of input signals, at least one of a phase difference, an amplitude ratio, or an intensity ratio between the input signal and the output signal corresponding to the input signal during a calibration operation of the signal processing device in which calibration signals are used as the plurality of input signals and are input to the plurality of amplifiers; and specifying a maximum value and a minimum value for numerical values of any of the phase difference, the amplitude ratio, or the intensity ratio, determine whether or not a first difference is equal to or greater than a first threshold, and controlling whether or not to execute the distortion compensation processing on the calibration signals based on the determination result, wherein the first difference is a difference between the maximum value and the minimum value.

* * * * *